US012785438B2

(12) United States Patent
Tian et al.

(10) Patent No.: US 12,785,438 B2
(45) Date of Patent: Nov. 3, 2026

(54) POWER SUPPLY APPARATUS, AND CHARGING METHOD AND SYSTEM

(71) Applicants: GUANGDONG OPPO MOBILE TELECOMMUNICATIONS CORP., LTD., Dongguan (CN); Powerland Technology Inc., Nanjing (CN)

(72) Inventors: Chen Tian, Dongguan (CN); Jialiang Zhang, Dongguan (CN); Jingpeng Zhu, Nanjing (CN); Weiwei Lu, Nanjing (CN); Juanjuan Sun, Nanjing (CN); Julu Sun, Nanjing (CN)

(73) Assignees: GUANGDONG OPPO MOBILE TELECOMMUNICATIONS CORP., LTD., Dongguan (CN); Powerland Technology Inc., Nanjing (CN)

( * ) Notice: Subject to any disclaimer, the term of this patent is extended or adjusted under 35 U.S.C. 154(b) by 848 days.

(21) Appl. No.: 18/136,946

(22) Filed: Apr. 20, 2023

(65) Prior Publication Data

US 2023/0261498 A1 Aug. 17, 2023

Related U.S. Application Data

(63) Continuation of application No. PCT/CN2021/118056, filed on Sep. 13, 2021.

(30) Foreign Application Priority Data

Nov. 12, 2020 (CN) ........................ 202011263052.X

(51) Int. Cl.

| | |
|---|---|
| ***H02J 7/94*** | (2026.01) |
| ***H02M 3/158*** | (2006.01) |
| *H02J 105/44* | (2026.01) |

(52) U.S. Cl.
CPC ............. *H02J 7/94* (2026.01); *H02M 3/1582* (2013.01); *H02J 2105/44* (2026.01); *H02J 2207/20* (2020.01)

(58) Field of Classification Search
CPC . H02J 2105/44; H02J 2207/20; H02M 3/1582
See application file for complete search history.

(56) References Cited

U.S. PATENT DOCUMENTS

2019/0252995 A1* 8/2019 Dai ......................... H02M 7/06
2020/0153178 A1 5/2020 Zhang et al.

FOREIGN PATENT DOCUMENTS

CN 1205807 A 1/1999
CN 2870378 Y 2/2007
(Continued)

OTHER PUBLICATIONS

EPO, Office Action for EP Application No. 21890796.2 mailed on May 22, 2025.

(Continued)

*Primary Examiner* — Robert Grant
(74) *Attorney, Agent, or Firm* — Sheppard, Mullin, Richter & Hampton LLP

(57) ABSTRACT

Provided are a power supply apparatus, and a charging method and system. The apparatus includes: a rectifier module (210) configured to rectify an alternating current (alternating current) voltage to obtain a first pulsating direct current (direct current) voltage; a conversion module (300) configured to convert the first pulsating direct current voltage to obtain a stable direct current voltage; and a valley-fill circuit (220) having an input terminal connected to an output terminal of the rectifier module (210) and an output terminal connected to an input terminal of the conversion module (300). The valley-fill circuit (220) is configured to release electric energy to the conversion module (300) when a voltage value of the first pulsating direct current voltage is (Continued)

smaller than a first voltage threshold, to increase a valley voltage of the first pulsating direct current voltage inputted to the conversion module (300).

20 Claims, 11 Drawing Sheets

(56) References Cited

FOREIGN PATENT DOCUMENTS

| | | | |
|---|---|---|---|
| CN | 103618461 | A | 3/2014 |
| CN | 104079185 | A | 10/2014 |
| CN | 109075697 | A | 12/2018 |
| CN | 109599924 | A | 4/2019 |
| CN | 111771326 | A | 10/2020 |
| CN | 112468003 | A | 3/2021 |
| WO | 2022142803 | A1 | 7/2022 |

OTHER PUBLICATIONS

International Search Report and Written Opinion dated Nov. 25, 2021 in International Application No. PCT/CN2021/118056. English translation attached.
First Office Action from corresponding Chinese Application No. 202011263052.X, dated Aug. 23, 2021. English translation attached.
The Second Office Action from corresponding Chinese Application No. 202011263052.X, dated Feb. 7, 2022. English translation attached.
The Third Office Action from corresponding Chinese Application No. 202011263052.X, dated Jul. 20, 2022. English translation attached.
The Grant Notice from corresponding Chinese Application No. 202011263052.X, dated Dec. 5, 2022. English translation attached.
Extended European Search Report dated Feb. 8, 2024 received in European Patent Application No. EP21890796.2

* cited by examiner

POWER SUPPLY APPARATUS, AND CHARGING METHOD AND SYSTEM

CROSS-REFERENCE TO RELATED APPLICATIONS

This application is a continuation of International Application No. PCT/CN2021/118056, filed on Sep. 13, 2021, which claims priority to Chinese Application No. 202011263052.X, filed on Nov. 12, 2020. The disclosures of the aforementioned applications are hereby incorporated by reference in their entireties.

FIELD

The present disclosure relates to the field of charging technologies, and more particularly, to a power supply apparatus, and a charging method and system.

BACKGROUND

With the rapid development of electronic technologies, more and more electronic products in various forms emerge on the market and have become an indispensable part of user's life. Many electronic products (such as mobile phones and wearable devices) on the market need to be frequently charged for ensuring normal operation. At present, an apparatus (for example, an adapter, etc.) capable of providing a power supply for the electronic product generally has a large volume and is inconvenient to carry. It is an urgent problem to reduce the volume of the apparatus providing the power supply.

SUMMARY

Embodiments of the present disclosure provide a power supply apparatus, and a charging method and system, which can reduce a volume of the power supply apparatus and ensure stability of an output voltage of the power supply apparatus.

A power supply apparatus provided by the embodiment of the present disclosure includes: a rectifier module configured to rectify an alternating current voltage to obtain a first pulsating direct current voltage; a conversion module configured to convert the first pulsating direct current voltage to obtain a stable direct current voltage; and a valley-fill circuit having an input terminal connected to an output terminal of the rectifier module and an output terminal connected to an input terminal of the conversion module. The valley-fill circuit is configured to release electric energy to the conversion module when a voltage value of the first pulsating direct current voltage is smaller than a first voltage threshold, to increase a valley voltage of the first pulsating direct current voltage inputted to the conversion module.

A charging method provided by the embodiment of the present disclosure, applied in a power supply apparatus, includes: rectifying, by a rectifier module, a received alternating current voltage to obtain a first pulsating direct current voltage; converting, by a conversion module, the first pulsating direct current voltage to obtain a stable direct current voltage; and releasing, by a valley-fill circuit, electric energy to the conversion module when a voltage value of the first pulsating direct current voltage is smaller than a first voltage threshold, to increase a valley voltage of the first pulsating direct current voltage inputted to the conversion module, wherein the valley-fill circuit has an input terminal connected to an output terminal of the rectifier module and an output terminal connected to an input terminal of the conversion module.

A charging system provided by the embodiment of the present disclosure includes: the power supply apparatus described above; and a terminal device. The power supply apparatus has an output interface connected to an output terminal of a second-level conversion circuit of the power supply apparatus. The terminal device includes a battery charging circuit. The battery charging circuit is configured to receive the stable direct current voltage outputted by the output interface and load the stable direct current voltage to a battery.

Details of one or more embodiments of the present disclosure are set forth in the following drawings and description. Other features and beneficial effects of the present disclosure will be embodied in the description, drawings, and claims.

BRIEF DESCRIPTION OF THE DRAWINGS

In order to clearly explain technical solutions of embodiments of the present disclosure, drawings used in description of embodiments are briefly described below. Obviously, the drawings as described below are merely some embodiments of the present disclosure. Based on these drawings, other drawings can be obtained by those skilled in the art without creative effort.

DETAILED DESCRIPTION

Technical solutions according to embodiments of the present disclosure will be described below clearly and completely in combination with accompanying drawings of the embodiments of the present disclosure. Obviously, the embodiments described below are only a part of the embodiments of the present disclosure, rather than all of the embodiments. Based on the embodiments in the present disclosure, all other embodiments obtained by a person skilled in the art without paying creative labor shall fall within the scope of the present disclosure.

It should be noted that, terms "including", "comprising" and "having" and any variations thereof in the embodiments of the present disclosure and the accompanying drawings indicate non-exclusive inclusions. For example, a process, a method, a system, a product, or a device that includes a series of actions or units is not necessarily limited to those clearly listed actions or modules. However, some embodiments may further optionally include other actions or modules that are not clearly listed or may further optionally include other actions or modules that are inherent to the process, the method, the product, or the device.

It can be understood that, while the terms "first", "second", etc., may be used to describe individual elements, these elements should not be limited by these terms. These terms are used only to distinguish a first element from another. For example, without departing from the scope of the present disclosure, a first capacitor may be referred to as a second capacitor, and similarly, a second capacitor may be referred to as a first capacitor. Both the first capacitor and the second capacitor are capacitors, but not the same capacitor.

Figure 1A:
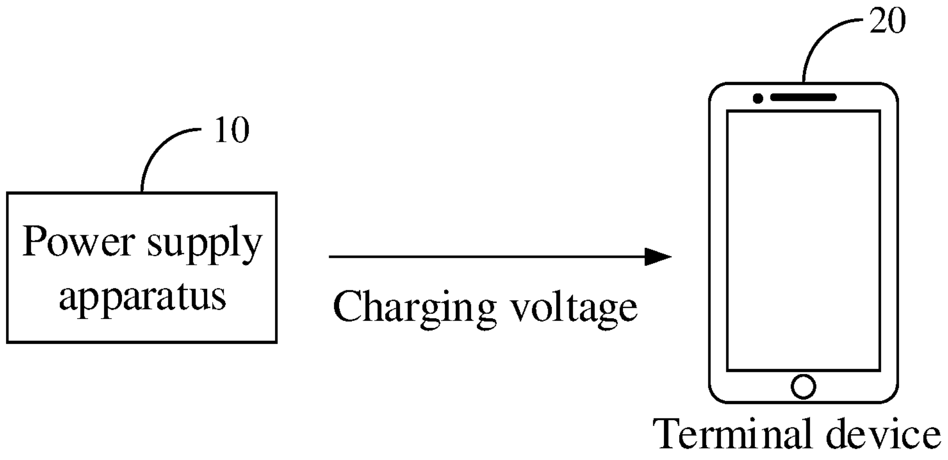
FIG. 1A illustrates an application scenario diagram of a power supply apparatus according to an embodiment.

FIG. 1A illustrates an application scenario diagram of a power supply apparatus according to an embodiment. As illustrated in FIG. 1A, the power supply apparatus 10 may output a charging voltage satisfying a charging requirement to a terminal device 20, to charge the terminal device 20. In at least one embodiment, the power supply apparatus 10 may include, but is not limited to, an adapter, a mobile power source, etc., and the terminal device 20 may include, but is not limited to, a mobile phone, a tablet computer, a wearable device, a notebook computer, a Personal Computer (PC), etc. The power supply apparatus 10 and the terminal device 20 are not limited to any specific product forms in the embodiments of the present disclosure.

The power supply apparatus 10 may receive commercial power provided by power grid. The commercial power is an alternating current voltage, while a charging voltage satisfying the charging requirement is usually a direct current voltage. Therefore, the power supply apparatus 10 is required to convert the received alternating current voltage to obtain the direct current voltage for charging the terminal device 20. For example, FIG. 1B is provided to illustrate a structural block diagram of a power supply apparatus known in the related art, in order to clearly illustrate a specific manner in which the power supply apparatus 10 converts the alternating current voltage into the direct current voltage in the related art.

Figure 1B:
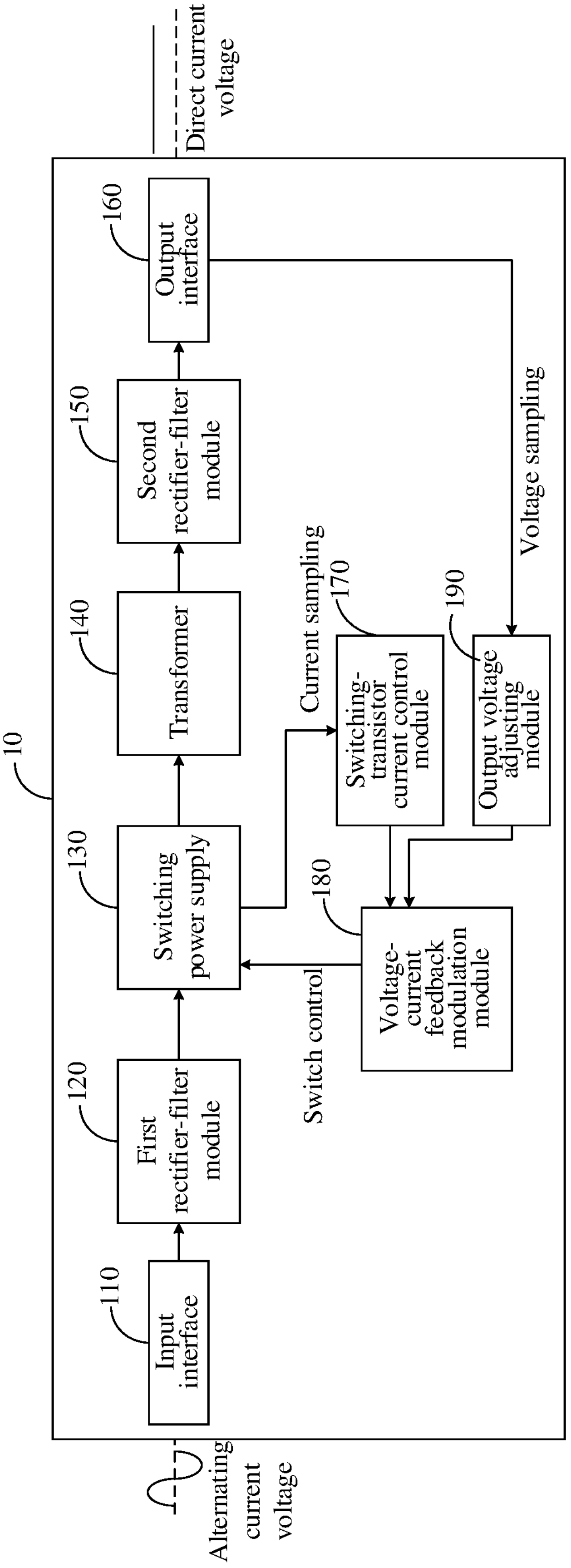
FIG. 1B (Prior Art)
FIG. 1B is a structural block diagram of a power supply apparatus in the related art.

As illustrated in FIG. 1B, the power supply apparatus 10 may include an input interface 110, a first rectifier-filter module 120, a switching power supply 130, a transformer 140, a second rectifier-filter module 150, an output interface 160, a switching-transistor current control module 170, a voltage-current feedback modulation module 180, and an output voltage adjusting module 190.

The alternating current voltage may be inputted to the power supply apparatus 10 through the input interface 110 of the power supply apparatus 10. The first rectifier-filter module 120 may receive the alternating current voltage transmitted through the input interface 110 and perform rectification and filtering processing on the alternating current voltage, to obtain a pulsating direct current voltage having a first waveform. In at least one embodiment, the first waveform may be a bun-shaped waveform. The switching power supply 130 may perform chopping modulation on the pulsating direct current voltage outputted by the first rectifier-filter module 120, to obtain a pulsating voltage having a second waveform. In at least one embodiment, the second waveform may be a square waveform. The transformer 140 may perform voltage transformation processing on the obtained pulsating voltage subjected to chopping modulation of the switching power supply 130, and perform filtering processing on the voltage transformed by the transformer 130 through the second rectifier-filter module 150, thereby obtaining a relatively stable direct current voltage.

The switching-transistor current control module 170 may perform current sampling on the switching power supply 130, and feed the sampled current back to the voltage-current feedback modulation module 180. The output voltage adjusting module 190 may perform voltage sampling on the output interface 160 and feed the sampled voltage back to the voltage-current feedback modulation module 180.

The voltage-current feedback modulation module 180 may control ON/OFF of the switching power supply 130 based on the current fed back by the switching-transistor current control module 170 and the voltage fed back by the output voltage adjusting module 190. In this way, a magnitude of direct current power outputted by the power supply apparatus 10 can be adjusted.

In the related art, the pulsating direct current voltage is usually filtered by using an electrolytic capacitor with a large volume, which causes the power supply apparatus 10 to have a large volume. The embodiments of the present disclosure provide the power supply apparatus, to be able to reduce the volume of the power supply apparatus.

Figure 2:
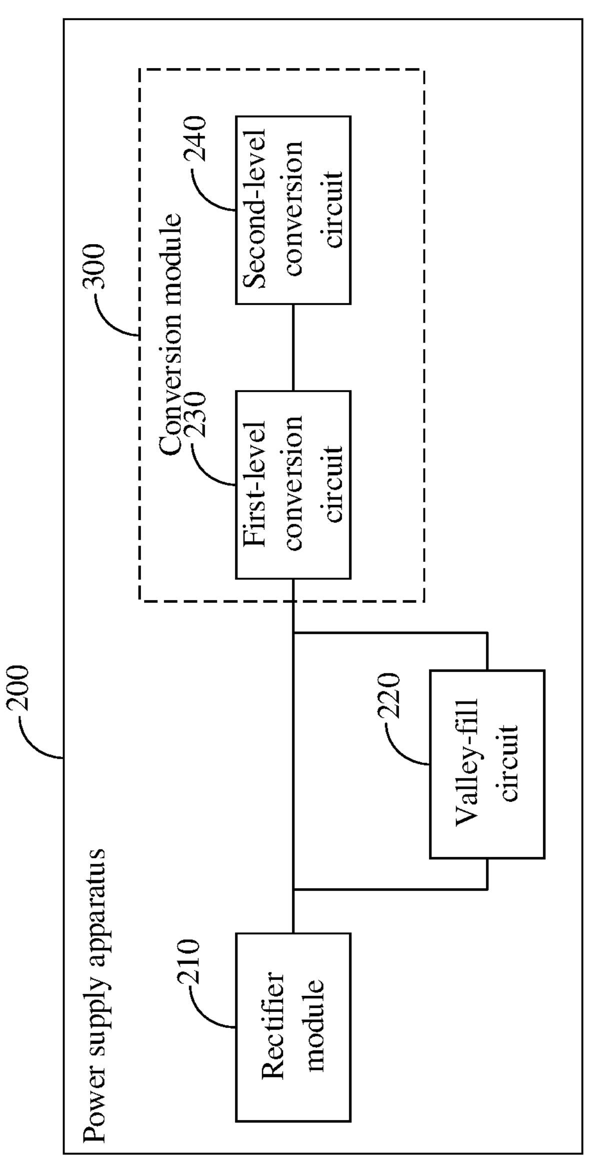
FIG. 2 is a structural block diagram of a power supply apparatus according to an embodiment.

As illustrated in FIG. 2, an embodiment provides a power supply apparatus 200. The power supply apparatus 200 may include a rectifier module 210, a valley-fill circuit 220, and a conversion module 300. The valley-fill circuit 220 may be disposed between the rectifier module 210 and the conversion module 300. An input terminal of the valley-fill circuit 220 may be connected to an output terminal of the rectifier module 210, and an output terminal of the valley-fill circuit 220 may be connected to an input terminal of the conversion module 300.

The rectifier module 210 is configured to rectify the alternating current voltage to obtain a first pulsating direct current voltage.

The power supply apparatus 200 may receive the alternating current voltage through the input interface. The alternating current voltage may be the commercial power received from the power grid, and a voltage standard of the alternating current voltage may be set in accordance with an actual application. For example, the voltage standard may be, but is not limited to, 220 Volt (V), 100V, 110V, etc. The specific voltage value of the alternating current voltage is not limited in the embodiments of the present disclosure. The rectifier module 210 may rectify the received alternating current voltage and convert an alternating current voltage with positive and negative changes into a unidirectional pulsating direct current voltage, thereby obtaining a first pulsating direct current voltage having a first pulsating waveform and inputting the first pulsating direct current voltage to the conversion module 300. In at least one embodiment, the first pulsating waveform may be a curved waveform, such as the bun-shaped waveform. The pulsating direct current voltage refers to a direct current voltage having an unchanged direction and a magnitude periodically varying with time.

The output terminal of the rectifier module 210 may be connected to the input terminal of the valley-fill circuit 220 to provide the valley-fill circuit 220 with an input voltage, thereby ensuring normal operation of the valley-fill circuit 220.

Figure 3A:
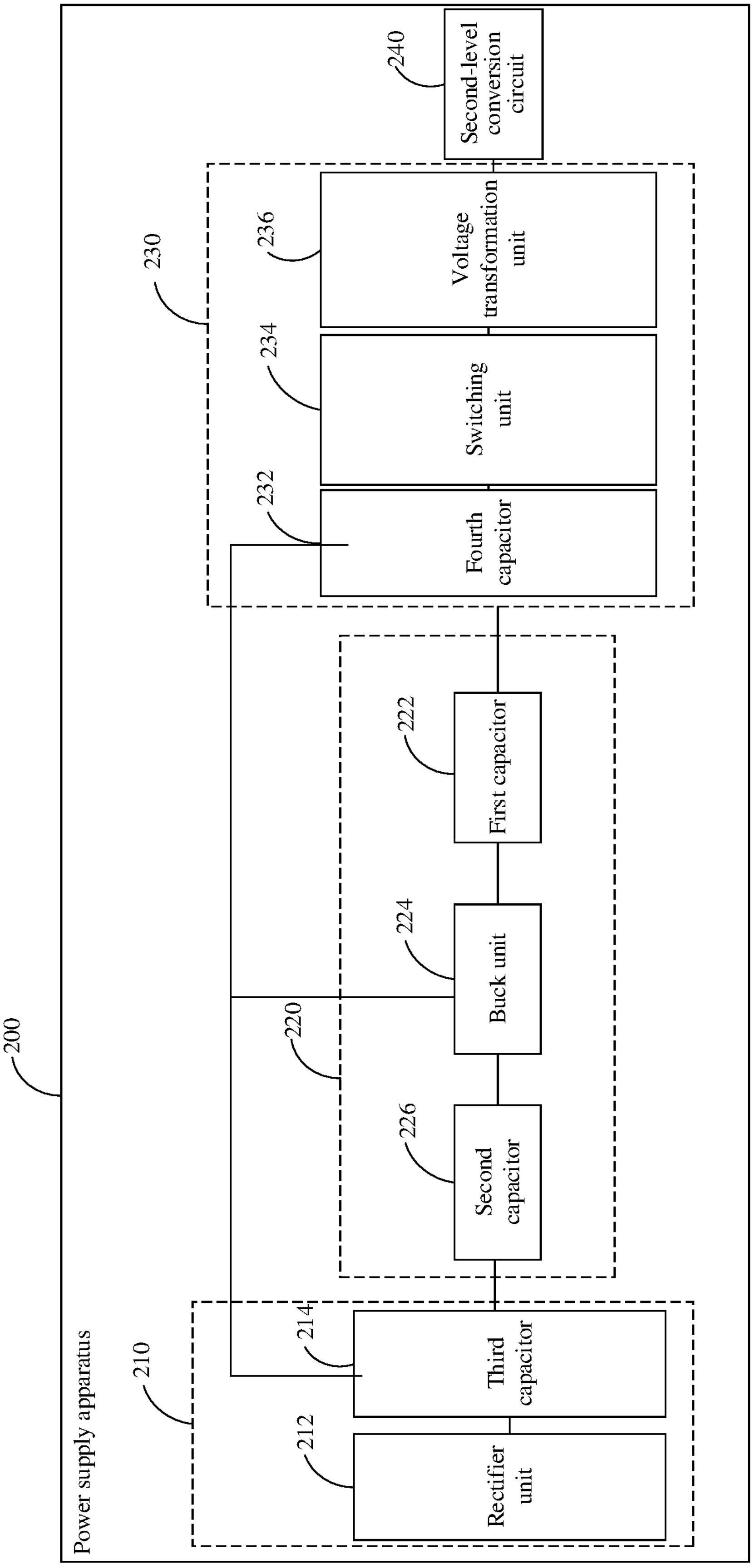
FIG. 3A is a structural block diagram of a power supply apparatus according to another embodiment.

As illustrated in FIG. 3A, in an embodiment, the rectifier module 210 may include a rectifier unit 212 and a third capacitor 214. The rectifier unit 212 may be connected to the third capacitor 214. The rectifier unit 212 may include a diode bridge rectifier. The alternating current voltage may be rectified and filtered by the rectifier unit 212 and the third capacitor 214, to obtain the first pulsating direct current voltage. In some embodiments, the third capacitor 214 has a capacity smaller than a capacity threshold. By selecting a second capacitor having a small capacity, a volume of the second capacitor can be reduced, and thus the volume of the entire power supply apparatus 200 can also be reduced.

In at least one embodiment, the third capacitor 214 may include any one of a ceramic chip capacitor, a thin film capacitor, an electrolytic capacitor having a capacity smaller than the capacity threshold, etc. The ceramic chip capacitor may include a Multi-layer Ceramic Capacitors (MLCC). The MLCC is formed by laminating a ceramic material layer and an electrode material layer that are parallel to each other. The thin film capacitor may be a capacitor of cylindric structure formed by winding metal foil together with a plastic film such as polyethylene, polypropylene, polystyrene, or polycarbonate that overlap on both terminals. It should be noted that the third capacitor 214 may also be another chip capacitor, which is not limited herein.

The conversion module 300 is configured to convert the first pulsating direct current voltage to obtain a stable direct current voltage.

In an embodiment, the conversion module 300 includes a first-level conversion circuit 230 and a second-level conversion circuit 240. The first-level conversion circuit 230 may be connected to the second-level conversion circuit 240. The output terminal of the valley-fill circuit 220 is connected to an input terminal of the first-level conversion circuit 230.

The first-level conversion circuit 230 is configured to perform isolation conversion on the first pulsating direct current voltage to obtain a second pulsating direct current voltage.

The second-level conversion circuit 240 is configured to convert the second pulsating direct current voltage to obtain the stable direct current voltage.

The first-level conversion circuit 230 can efficiently perform the voltage isolation transformation on the first pulsating direct current voltage outputted by the rectifier module 210. In some embodiments, the first-level conversion circuit 230 can be a buck circuit and perform buck conversion on the first pulsating direct current voltage outputted by the rectifier module 210 to obtain the second pulsating direct current voltage. The second pulsating direct current voltage may be smaller than the first pulsating direct current voltage. For example, the first pulsating direct current voltage outputted by the rectifier module ranges from 52 V to 250 V, and the second pulsating direct current voltage obtained after being subjected to conversion through the first-level conversion circuit 230 may range from 5 V to 25 V, but is not limited thereto. In at least one embodiment, the first-level conversion circuit 230 may also be a boost circuit, which is not limited herein.

The second-level conversion circuit 240 can convert the second pulsating direct current voltage into the stable direct current voltage. The stable direct current voltage may be a constant direct current voltage with a fixed voltage, or an approximately constant direct current voltage (having a small wave amplitude). In some embodiments, the stable direct current voltage obtained by the second-level conversion circuit 240 may be a charging voltage satisfying a charging requirement of the terminal device, or a direct current voltage required to be further subjected to voltage conversion to satisfy the charging requirement.

It should be noted that the conversion module 300 may include only a single-level conversion circuit, instead of being limited to the above-mentioned double-level conversion circuit architecture, which is not limited in the embodiments of the present disclosure.

The valley-fill circuit 220 is configured to release electric energy to the conversion module 300 when a voltage value of the first pulsating direct current voltage is smaller than a first voltage threshold, to increase a valley voltage of the first pulsating direct current voltage inputted to the conversion module 300.

The valley voltage may refer to the minimum voltage value of the first pulsating direct current voltage in a voltage magnitude-changing period. In order to reduce a volume of the adapter, a capacitor having the capacity smaller than the capacity threshold is employed as the third capacitor 214, resulting in that the first pulsating direct current voltage rectified by the rectifier module 210 has a relatively low alley voltage, for example, the valley voltage is 0V. In addition, when the first pulsating direct current voltage having the relatively low valley voltage is directly inputted to the conversion module 300, a post-level circuit cannot be provided with sufficient power. Thus, an output of the post-level conversion circuit can be hardly maintained, thereby leading to poor stability of the outputted voltage. Moreover, due to the relatively low valley voltage of the first pulsating direct current voltage obtained by rectification, the post-level circuit has a relatively high peak current, and thus a magnetic element with a large volume is required to complete the voltage conversion.

In the embodiment of the present disclosure, when it is detected that a voltage value of the first pulsating direct current voltage outputted by the rectifier module 210 is smaller than the first voltage threshold, the valley-fill circuit 220 provided in the power supply apparatus 200 can release the electric energy to the input terminal of the first-level conversion circuit 230, to increase the valley voltage of the first pulsating direct current voltage inputted to the first-level conversion circuit 230. In at least one embodiment, the first voltage threshold may be a predetermined voltage value, for example, but not limited to, 50 V, 45 V, etc.

In some embodiments, when the first pulsating direct current voltage outputted by the rectifier module 210 is greater than an output voltage of the valley-fill circuit 220, the first pulsating direct current voltage outputted by the rectifier module 210 can provide the valley-fill circuit 220 with the input voltage, and the valley-fill circuit 220 stores the electric energy. Moreover, when the output voltage of the valley-fill circuit 220 reaches the first voltage threshold, the input voltage is stopped providing to the valley-fill circuit 220. The first voltage threshold is an output voltage of the valley-fill circuit 220 when no electric energy is released by the valley-fill circuit 220. When the voltage value of the first pulsating direct current voltage outputted by the rectifier module 210 is smaller than the first voltage threshold, i.e., when the first pulsating direct current voltage outputted by the rectifier module 210 is smaller than the output voltage of the valley-fill circuit 220, the valley-fill circuit 220 may release the electric energy to the input terminal of the conversion module 300. In a process that the valley-fill circuit 220 releases the electric energy to the conversion module 300, a voltage value of the first pulsating direct current voltage inputted to the conversion module 300 remains the same as the output voltage of the valley-fill circuit 220. In this process, the valley-fill circuit 220 is naturally switched between two operating states, i.e., an electric energy releasing state and an electric energy storing state, without influencing other circuits and requiring additional voltage detection and judgment module for controlling the switching of the valley-fill circuit 220 between the electric energy releasing state and the electric energy storing state. In this way, the cost can be saved, and the volume of the power supply apparatus 200 can be further reduced.

According to the embodiments of the present disclosure, the power supply apparatus includes the rectifier module, the valley-fill circuit, and the conversion module; the rectifier module rectifies the alternating current voltage to obtain the first pulsating direct current voltage; the conversion module converts the first pulsating direct current voltage to obtain the stable direct current voltage; and the valley-fill circuit releases the electric energy to the conversion module when the voltage value of the first pulsating direct current voltage outputted by the rectifier module is smaller than the first voltage threshold, to increase the valley voltage of the first pulsating direct current voltage inputted to the conversion module. In this way, the valley voltage of the first pulsating direct current voltage inputted to the conversion module can be sufficiently high to provide the first-level conversion circuit with sufficient power support and ensure stability of an output voltage of the power supply apparatus. Moreover, the valley voltage of the first pulsating direct current voltage can be increased, and a peak current during subsequent voltage conversion can be reduced, thereby reducing a size of the magnetic element in the post-level circuit and reducing the volume of the power supply apparatus.

As illustrated in FIG. 3A, in an embodiment, the valley-fill circuit 220 may include a first capacitor 222, a buck unit 224, and a second capacitor 226. The buck unit 224 may be connected to the first capacitor 222 and the second capacitor 226, respectively. The first-level conversion circuit 230 may include a fourth capacitor 232. The fourth capacitor 232 can perform filtering processing on the inputted first pulsating direct current voltage.

The first capacitor 222 is configured to provide the electric energy to an input of the conversion module 300 when the voltage value of the first pulsating direct current voltage outputted by the rectifier module 210 is smaller than the first voltage threshold, enabling the voltage value of the first pulsating direct current voltage inputted to the conversion module 300 to be the same as a voltage value of the first capacitor.

Further, when the voltage value of the first pulsating direct current voltage outputted by the rectifier module 210 is smaller than the first voltage threshold, the first capacitor 222 may release the electric energy to the fourth capacitor 232 of the first-level conversion circuit 230, enabling the voltage value of the first pulsating direct current voltage inputted to the first-level conversion circuit 230 to be consistent with the voltage value of the first capacitor 222. When the voltage value of the first pulsating direct current voltage outputted by the rectifier module 210 is greater than the voltage value of the first capacitor 222, the first capacitor 222 may stop releasing the electric energy.

In an embodiment, the valley-fill circuit further includes a first diode. The first diode has a cathode connected to the input terminal of the conversion module 300 and an anode connected to the first capacitor 222. The first capacitor is further configured to release, when the voltage value of the first pulsating direct current voltage is smaller than the first voltage threshold, the electric energy to the input of the conversion module 300 through the first diode.

Figure 3B:
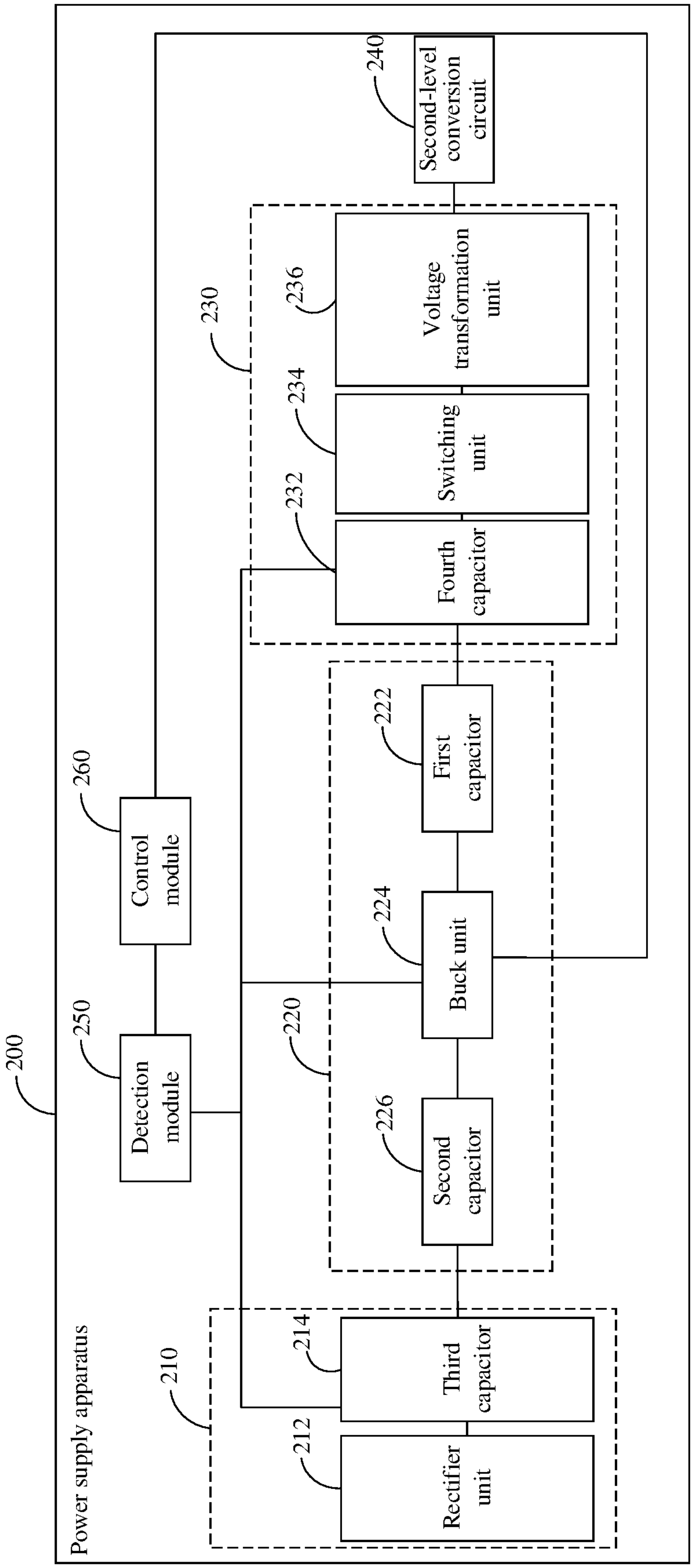
FIG. 3B is a structural block diagram of a power supply apparatus according to another embodiment.
Figure 3C:
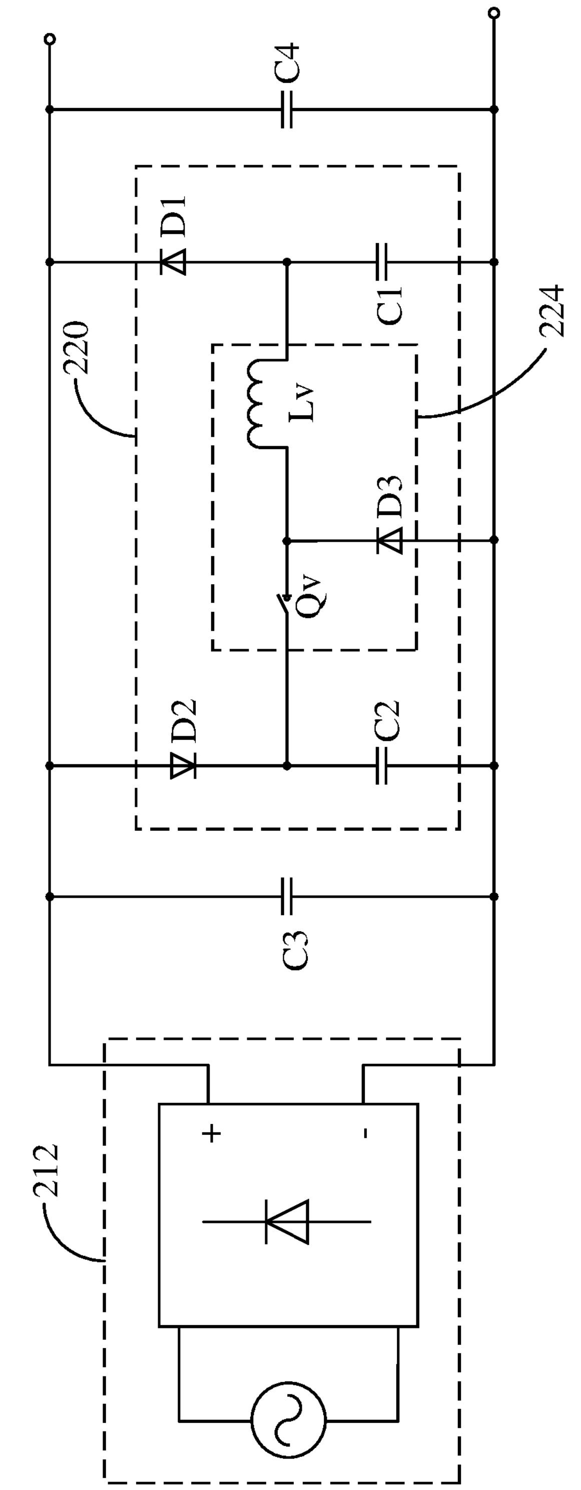
FIG. 3C is a structural block diagram of a rectifier module and a valley-fill module according to an embodiment.

As illustrated in FIG. 3C, in an embodiment, the valley-fill circuit 220 further includes the first diode D1. The cathode of the first diode D1 is connected to the input terminal of the first-level conversion module 230. Specifically, the cathode of the first diode D1 is connected to the fourth capacitor C4 of the first-level conversion module 230, and the anode of the first diode D1 is connected to the first capacitor 222. The first capacitor 222 is further configured to release, when the voltage value of the first pulsating direct current voltage is smaller than the first voltage threshold, the electric energy to the input of the first-level conversion module 230 through the first diode D1.

The first voltage threshold may be a voltage maintained by the first capacitor 222 when releasing no electric energy. When the voltage value of the first pulsating direct current voltage outputted by the rectifier module 210 is smaller than the first voltage threshold, the first diode D1 is switched on, and the first capacitor 222 can release the electric energy to the fourth capacitor 232 through the first diode D1. When the voltage value of the first pulsating direct current voltage outputted by the rectifier module 210 is greater than the voltage value of the first capacitor 222, the first diode D1 is switched off, and the first capacitor 222 stops releasing the electric energy to the fourth capacitor 232. By means of the first diode, a unidirectional flow of energy can be ensured, thereby improving overall stability of the circuit.

The second capacitor 226 is configured to release the electric energy when the voltage value of the first pulsating direct current voltage outputted by the rectifier module 210 reaches a second voltage threshold, to provide the input of the conversion module 300 with the electric energy.

The second voltage threshold may be smaller than the first voltage threshold. When the voltage value of the first pulsating direct current voltage outputted by the rectifier module 210 is smaller than the first voltage threshold, the first capacitor 222 provides the fourth capacitor 232 of the first-level conversion circuit 230 with the electric energy. Since the third capacitor 214 in the rectifier module 210 has a capacity smaller than the capacity threshold, the first pulsating direct current voltage outputted by the rectifier module 210 may continue to decrease and provide less power for the post-level circuit. When the first pulsating direct current voltage outputted by the rectifier module 210 drops to the second voltage threshold, the second capacitor 226 can release the electric energy, to provide the post-level circuit with part of power support. In at least one embodiment, the second voltage threshold may be the minimum value of the first pulsating direct current voltage outputted by the rectifier module 210, for example, but not limited to, 0V.

In some embodiments, since the rectifier module 210 for providing the input voltage to the valley-fill circuit 220 outputs the first pulsating direct current voltage with a high voltage amplitude, the second capacitor 226 may be a high-voltage capacitor, which has a nominal voltage greater than a second predetermined value, for example, greater than 1 kilovolt (KV), 10 KV, etc. A voltage outputted by the second capacitor 226 can be only inputted to the fourth capacitor 232 of the first-level conversion circuit 230 after being subjected to the buck conversion, in order to ensure that the first-level conversion circuit 230 is provided with energy at a valley of the first pulsating direct current voltage.

The buck unit 224 is further configured to: perform, when the voltage value of the first pulsating direct current voltage outputted by the rectifier module reaches the second voltage threshold, buck conversion on an output voltage of the second capacitor 226 by starting operating; and provide the electric energy to the input of the conversion module through the output voltage subjected to the buck conversion 300.

In some embodiments, as illustrated in FIG. 3B, the power supply apparatus 200 further includes a detection module 250 and a control module 260. The detection module 250 may be connected to the output terminal of the rectifier module 210. The control module 260 has an input terminal connected to an output terminal of the detection module 250 and an output terminal connected to the buck unit 224.

The detection module 250 is configured to detect the voltage value of the first pulsating direct current voltage outputted by the rectifier module 210.

The control module 260 is configured to control the buck unit 224 to start operating, when the voltage value of the first pulsating direct current voltage detected by the detection module 250 reaches the second voltage threshold.

The detection module 250 can perform voltage sampling on the first pulsating direct current voltage outputted by the rectifier module 210, collect the voltage value of the first pulsating direct current voltage, and generate a detection signal based on the voltage value. As an optional implementation, the detection signal may be the voltage value of the first pulsating direct current voltage. The control module 260, when receiving the detection signal, may determine the voltage value of the first pulsating direct current voltage based on the detection signal, and determine whether the voltage value of the first pulsating direct current voltage reaches the second voltage threshold. When the voltage value of the first pulsating direct current voltage reaches the second voltage threshold, the voltage value of the first pulsating direct current voltage is the second voltage threshold, or a difference value between the voltage value of the first pulsating direct current voltage and the second voltage threshold is smaller than a predetermined value, i.e., the voltage value of the first pulsating direct current voltage is close to the second voltage threshold.

For example, the detection module 250 includes a divider resistor and can perform sampling on the first pulsating direct current voltage through resistor dividing to generate a detection signal; or the detection module 250 includes a voltage detection chip and can detect the voltage value of the first pulsating direct current voltage using the voltage detection chip. The embodiments of the present disclosure do not limit the manner that the detection module 250 acquires the voltage value of the first pulsating direct current voltage.

In some embodiments, as illustrated in FIG. 3C, the buck unit 224 may include a modulation switch Qv, a first inductor Lv, and a third diode D3. The modulation switch Qv may be connected to the second capacitor C2 and be configured to perform chopping modulation on the voltage outputted by the second capacitor C2. The modulation switch Qv may be switched between a switch-on state and a switch-off state at a high frequency, and perform high-frequency chopping modulation on the voltage outputted by the second capacitor C2. The first inductor Lv and the first capacitor C1 may constitute a first-level LC filter. A stable voltage can be outputted after the voltage obtained by the chopping modulation through the modulation switch Qv passes through the first-level LC filter, the third diode D3 may be used for a continuous current, and the voltage outputted to the fourth capacitor C4 may be stabilized through the second diode D2 and the first inductor Lv, thereby avoiding generating a surge voltage.

When the voltage value of the first pulsating direct current voltage detected by the detection module 250 reaches the second voltage threshold, the control module 260 controls the buck unit 224 to start operating and may transmit a control signal to the modulation switch Qv. The modulation switch Qv may be switched between the switch-on state and the switch-off state at a high frequency based on the control signal outputted by the control module 260, to perform the chopping modulation on the voltage outputted by the second capacitor C2.

According to the embodiments of the present disclosure, the buck unit 224 can ensure that the voltage outputted by the valley-fill circuit 220 is smooth and natural, to stably improve the valley voltage of the first pulsating direct current voltage inputted to the first-level conversion circuit 230.

In some embodiments, the buck unit 224 is further configured to: perform, when the voltage value of the first pulsating direct current voltage outputted by the rectifier module 210 satisfies a first voltage condition or when the voltage value of the first capacitor 222 satisfies a second voltage condition, buck conversion on the first pulsating direct current voltage outputted by the rectifier module; and charge the first capacitor 222 with the first pulsating direct current voltage subjected to the buck conversion.

In at least one embodiment, the first voltage condition may include, but not limited to, that the voltage value of the first pulsating direct current voltage outputted by the rectifier module 210 is greater than a first predetermined voltage value; or that the voltage value of the first pulsating direct current voltage outputted by the rectifier module 210 is greater than the voltage value of the first capacitor 222; or that the voltage value of the first pulsating direct current voltage outputted by the rectifier module 210 is greater than a voltage value of the second capacitor 226, or the like. The second voltage condition may include, but not limited to, that the voltage value of the first capacitor 222 is smaller than a second predetermined voltage value; or that the voltage value of the first capacitor 222 is smaller than the voltage value of the first pulsating direct current voltage outputted by the rectifier module 210, or the like.

The specific data of the first predetermined voltage value and second predetermined voltage value are not specifically limited in the embodiments of the present disclosure. For example, the first predetermined voltage value may be 25V, and the second predetermined voltage value may be 20V; the first predetermined voltage value and the second predetermined voltage value are the same and both are 23V; the first predetermined voltage value may be 24V, and the second predetermined voltage value may be 25V; or the like.

The buck unit 224 has an input terminal connected to the output terminal of the rectifier module 210, and an output terminal connected to the first capacitor 222. When the first pulsating direct current voltage outputted by the rectifier module 210 satisfies the first voltage condition or when the voltage value of the first capacitor 222 satisfies the second voltage condition, the buck unit 224 can continue to operate. The modulation switch Qv can perform the chopping modulation on the first pulsating direct current voltage outputted by the rectifier module 210. The relatively stable direct current voltage can be obtained after the voltage subjected to the chopping modulation passes through the LC filter, which is composed of the first inductor Lv and the first capacitor 222, and during this process, the first capacitor 222 performs energy storage and charging.

The buck unit 224 is further configured to stop, when the voltage value of the first capacitor 222 reaches the first voltage threshold, charging the first capacitor by stopping operating.

In some embodiments, the power supply apparatus 200 may further include a capacitor voltage detection module connected to the first capacitor 222 and the control module 260, respectively. The capacitor voltage detection module may be configured to: sample the voltage value of the first capacitor 222 when the first capacitor 222 is in a charging state, and feed the detected voltage value of the first capacitor 222 back to the control module 260. The control module 260 can determine whether the voltage value of the first capacitor 222 detected by the capacitor voltage detection module reaches the first voltage threshold. When the voltage value of the first capacitor 222 reaches the first voltage threshold, the control module 260 can control the buck unit 224 to stop operating. When the buck unit 224 stops operating, the modulation switch Qv may be in the switch-off state, and the voltage of the first capacitor 222 is maintained at the first voltage threshold.

In some embodiments, the first voltage threshold may be determined based on a voltage standard of the alternating current voltage and/or output power required to be outputted by the power supply apparatus 200. Different first voltage thresholds may be set for the alternating current voltages under different voltage standards, and the first voltage threshold may also be adjusted based on the output power required to be outputted by the power supply apparatus 200, enabling the first pulsating voltage inputted to the first-level conversion circuit 230 to satisfy different requirements.

In the embodiment of the present disclosure, by means of the detection module 250 and the control module 260, the voltage value of the first pulsating direct current voltage outputted by the rectifier module 210 can be accurately detected, thereby precisely controlling the buck unit 224 to start operating. In addition, the voltage value of the first capacitor 222 can be accurately detected, and the buck unit 221 can be precisely controlled to stop operating by using the control module 260 and the capacitor voltage detection module. Therefore, the valley-fill circuit 230 can be accurately controlled to switch between the energy storage state and the energy releasing state, and the stability of a voltage outputted by the power supply apparatus 200 is improved.

In some embodiments, the second capacitor 226 is further configured to charge based on the first pulsating direct current voltage outputted by the rectifier module 210, when the voltage value of the first pulsating direct current voltage outputted by the rectifier module 210 is greater than the voltage value of the second capacitor 226.

As illustrated in FIG. 3C, in an embodiment, the valley-fill circuit further includes a second diode D2. The second diode D2 has a cathode connected to the second capacitor C2 and an anode connected to the output terminal of the rectifier module 210. In a further embodiment, the anode of the second diode is connected to the third capacitor C3 of the rectifier module 210. When the voltage value of the first pulsating direct current voltage outputted by the rectifier module 210 is greater than the voltage value of the second capacitor C2, the second diode D2 is switched on to charge the second capacitor C2 with the first pulsating direct current voltage. When the voltage value of the first pulsating direct current voltage outputted by the rectifier module 210 is smaller than the voltage value of the second capacitor C2, the second diode D2 is switched off, and the voltage of the second capacitor C2 is maintained. The second diode D2 can be used to ensure the unidirectional flow of energy, thereby achieving the charging control of the second capacitor C2.

In some embodiments, in order to increase the valley voltage of the first pulsating direct current voltage, the first capacitor 222 may be a low-voltage capacitor having a nominal voltage smaller than the first predetermined value, for example, but not limited to, smaller than 1 kV. The first predetermined value may be smaller than the second predetermined value described above. When the voltage value of the first pulsating direct current voltage outputted by the rectifier module 210 is smaller than the first voltage threshold, the low-voltage capacitor is first used to release the electric energy to an input of the first-level conversion circuit 230. When the voltage value of the first pulsating direct current voltage continues to decrease to the second voltage threshold, the high-voltage capacitor is then used to release the electric energy to the input of the first-level conversion circuit 230. By means of a combination of the low-voltage capacitor and the high-voltage capacitor, the energy can be absorbed and released to the maximum extent through the low-voltage and large-capacity capacitor, thereby improving a utilization rate of the capacitor. Further, the low-voltage capacitor may include, but not limited to, a high-density capacitor such as a tantalum capacitor and a ceramic chip capacitor; and the high-voltage capacitor may include, but not limited to, the high-density capacitor such as the ceramic chip capacitor. By using the low-voltage capacitor having a small volume and a large capacity to store energy at a low-voltage input stage of the first pulsating direct current voltage, an energy density is larger, and thus a total capacitance quantity and size can be reduced, thereby integrally reducing the volume of the power supply apparatus 200.

Figure 4A:
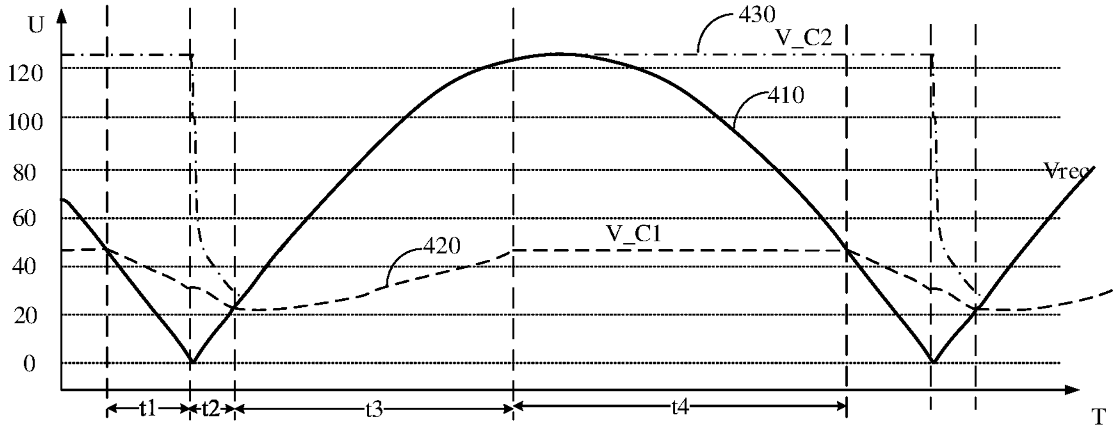
FIG. 4A is a schematic diagram of a waveform of a first pulsating direct current voltage without providing a valley-fill circuit in a power supply apparatus according to an embodiment.
Figure 4B:
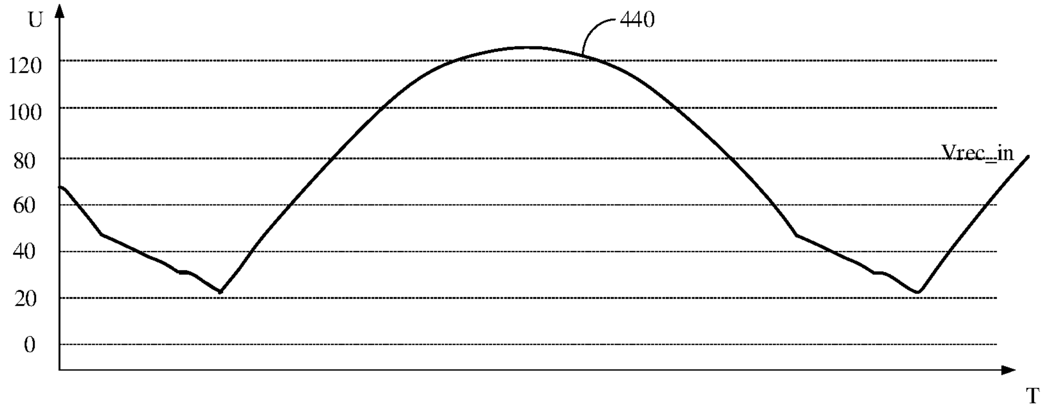
FIG. 4B is a schematic diagram of a waveform of a first pulsating direct current voltage when a valley-fill circuit is provided in a power supply apparatus according to an embodiment.

FIG. 4A is a schematic diagram of a waveform of a first pulsating direct current voltage without providing a valley-fill circuit in a power supply apparatus according to an embodiment. As illustrated in FIG. 4A, referring to a Vrec curve 410, the Vrec curve 410 represents the first pulsating direct current voltage inputted to the first-level conversion circuit 230 (i.e., the first pulsating direct current voltage outputted by the rectifier module 210) without providing the valley-fill circuit 220 in the power supply apparatus 200, and Vrec curve 410 also indicates that the valley voltage of the first pulsating direct current voltage inputted to the first-level conversion circuit 230 is 0V when the valley-fill 220 is not provided. FIG. 4B is a schematic diagram of a waveform of a first pulsating direct current voltage when a valley-fill circuit is provided in a power supply apparatus according to an embodiment. With reference to a Vrec_in curve 440 in FIG. 4B, the Vrec_in curve 440 represents the first pulsating direct current voltage inputted to the first-level conversion circuit 230 when the valley-fill circuit 220 is provided in the power supply apparatus 200, and the Vrec_in curve 440 also indicates that the valley voltage of the first pulsating direct current voltage inputted to the first-level conversion circuit 230 is 21V when the valley-fill 220 is provided. The valley-fill circuit 220 may raise the valley voltage of the first pulsating direct current voltage from 0V to 21V.

Further, referring to a V_C1 curve 420 and a V_C2 curve 430 in FIG. 4A, the V_C1 curve 420 represents the voltage of the first capacitor 222 in the valley-fill circuit 220, and the V_C2 curve 430 represents the voltage of the second capacitor 222 in the valley-fill circuit 220. In a time period t1, the Vrec curve 410 and the V_C1 curve 420 indicate that the first pulsating direct current voltage outputted by the rectifier module 210 is smaller than the voltage of the first capacitor 222 (i.e., the first voltage threshold), and the first capacitor 222 releases the electric energy to the fourth capacitor 232 of the first-level conversion circuit 230 through the first diode. In a time period t2, the first pulsating direct current voltage outputted by the rectifier module 210 decreases to 0V, and in this case, the buck unit 224 may start operating, and the second capacitor 226 releases the electric energy to the fourth capacitor 232 through the buck unit 224. In a time period t3, the first pulsating direct current voltage outputted by the rectifier module 210 is greater than the voltage of the first capacitor 222, the first capacitor 222 and the second capacitor 226 may be in a charging and energy storage state and perform energy storage with the first pulsating direct current voltage outputted by the rectifier module 210, and the buck unit 224 stops operating when the voltage of the first capacitor 222 reaches the first voltage threshold. In a time period t4, the voltage of the first capacitor 222 and the voltage of the second capacitor 226 are maintained. The Vrec curve 410 and the Vrec_in curve 440 intuitively indicates that the valley-fill circuit 220 can effectively increase the valley voltage of the first pulsating direct current voltage inputted to the first-level conversion circuit 230. It should be noted that FIG. 4B illustrates only one possible waveform and voltage value of the first pulsating direct current voltage, which is merely used to illustrate the embodiments of the present disclosure without limiting the specific waveform and voltage value of the first pulsating direct current voltage in the embodiments of the present disclosure.

As illustrated in FIG. 3A, in an embodiment, the first-level conversion circuit 230 may further include a switching unit 234 and a voltage transformation unit 236. The switching unit 234 may be connected to the voltage transformation unit 236.

The switching unit 234 is configured to perform chopping modulation on the inputted first pulsating direct current voltage to obtain a modulation voltage.

The voltage transformation unit 236 is configured to perform voltage transformation and rectification processing on the modulation voltage to obtain the second pulsating direct current voltage.

In an embodiment, the switching unit 234 may include at least four switching devices to form a switching network for supporting a full-bridge operating mode and a half-bridge operating mode. The switching unit 234 is further configured to be switched to the half-bridge operating mode when the voltage value of the inputted first pulsating direct current voltage is greater than a third voltage threshold, and to be switched to the full-bridge operating mode when an effective voltage value of the inputted first pulsating direct current voltage is smaller than a fourth voltage threshold. In at least one embodiment, the switching device may be a power switching device including a Metal-Oxide-Semiconductor Field-Effect (MOSFET) transistor, a gallium nitride (GaN) switching device, and the like, which is not limited thereto.

As a specific implementation, the switching unit 234 may be connected to the control module 260, and the detection module 250 may perform voltage sampling on the first pulsating direct current voltage inputted to the first-level conversion circuit 230 to detect the voltage value of the first pulsating direct current voltage. The detection module 250 detects the voltage value of the first pulsating direct current voltage in the manner as described in the above embodiments, which is not described in detail herein. The control module 260 is further configured to control, when the detection module 250 detects that the voltage value of the first pulsating direct current voltage is greater than the third voltage threshold, the switching unit 234 to be switched to the half-bridge operation mode; and control, when the detection module 250 detects that the effective voltage value of the first pulsating direct current voltage is smaller than the fourth voltage threshold, the switching unit 234 to be switched to the full-bridge operation mode.

When it is detected that the voltage value of the first pulsating direct current voltage is greater than the third voltage threshold, it indicates that the first pulsating direct current voltage is in a high-voltage range. When it is detected that the effective voltage value of the first pulsating direct current voltage is smaller than the fourth voltage threshold, it indicates that the first pulsating direct current voltage is in a low-voltage range. In at least one embodiment, in addition to the effective voltage value, a peak voltage, an average voltage, and the like of the first pulsating direct current voltage may also be detected to determine whether the peak voltage, average voltage, and the like are smaller than the fourth voltage threshold, which is not limited to the effective voltage value. The peak voltage refers to the maximum voltage value of the first pulsating direct current voltage in a voltage magnitude-changing period. The maximum voltage in the high voltage range may be greater than the maximum voltage in the low voltage range. For example, the high-voltage range may be from 50 to 220V, and the low-voltage range may be from 45 to 130V, etc., which are not limited thereto. When the inputted first pulsating direct current voltage is within the high voltage range, a second switching module may operate in the half-bridge mode; and when the inputted second pulsating direct current voltage is in the low voltage range, the second switching module may operate in the full bridge mode. In this way, it can be guaranteed that when a change range of the inputted first pulsating direct current voltage is wide, a change of a second pulsating direct current voltage outputted by the first-level conversion circuit 230 may be maintained in a narrow range, to facilitate following design and voltage transformation of the second-level conversion circuit 240.

Figure 5:
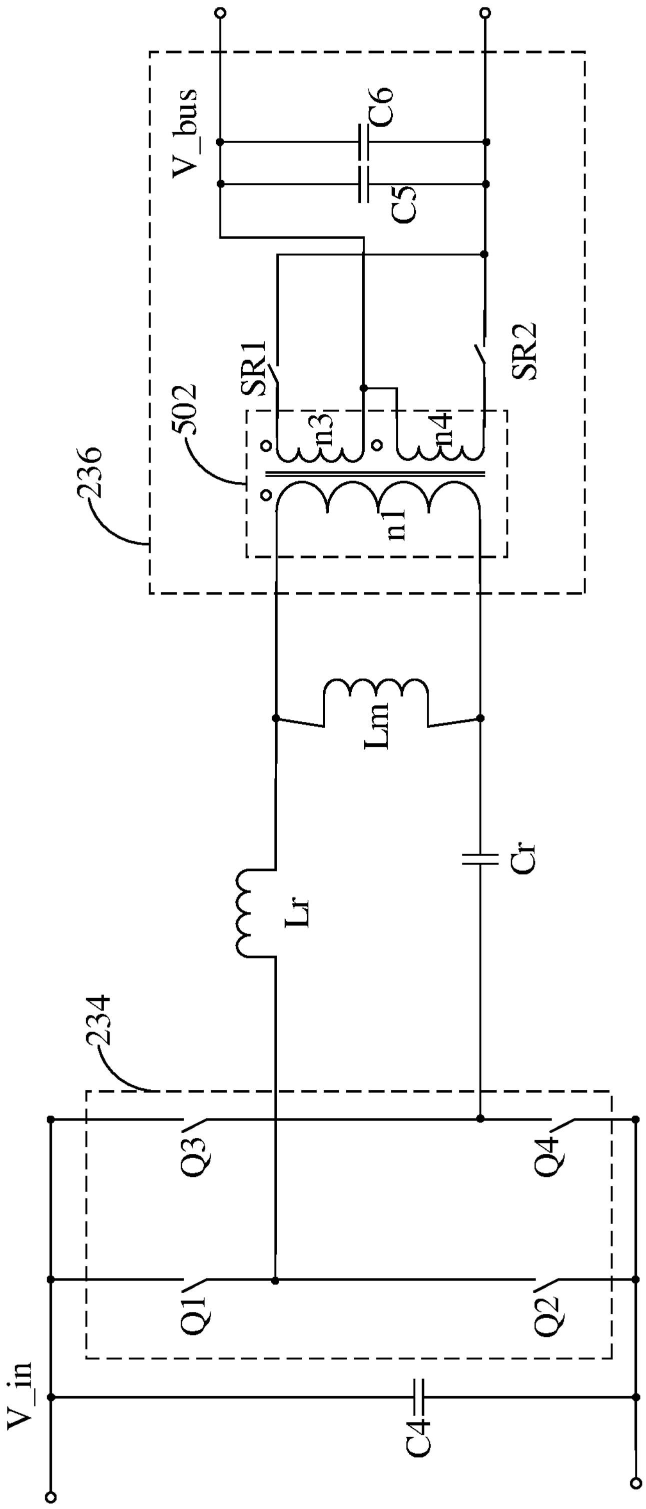
FIG. 5 is a schematic diagram of a first-level conversion circuit according to an embodiment.

FIG. 5 is a schematic diagram of a first-level conversion circuit according to an embodiment. As illustrated in FIG. 5, the switching unit 234 may include four switching devices, which are a switch Q1, a switch Q2, a switch Q3, and a switch Q4, respectively. When the switching unit 234 is in the half-bridge operation mode, the switch Q1 and the switch Q2 may operate. When the second switching unit 234 is in the full-bridge operation mode, the four switch devices may operate together. The control module 260 may transmit the control signal to the switch Q1, the switch Q2, the switch Q3, and the switch Q4, thereby controlling ON/OFF of the switch Q1, the switch Q2, the switch Q3, and the switch Q4, respectively. In at least one embodiment, the control signal may be a pulse signal or the like. For example, when the switching unit 234 is in the half-bridge operation mode, the control module 260 may only transmit a drive signal to the switch Q1 and the switch Q2 to control the switch Q1 and the switch Q2 to switch between the switch-on state and the switch-off state, control the switch Q3 to remain in the switch-off state, and control the switch Q4 to maintain the switch-on state.

The voltage transformation unit 236 may include a transformer 502, a switch SR1, a switch SR2, a fifth capacitor C5, and a sixth capacitor C6. The switching unit 234 performs the chopping modulation on the inputted first pulsating direct current voltage (i.e., V_in). The transformer 502 may include a primary winding n1, a secondary winding n2, and a secondary winding n3 and perform voltage transformation on the modulation voltage. Further, the transformer 502 may perform depressurization processing on the modulation voltage and perform filtering through the fifth capacitor C5 and the sixth capacitor C6, thereby obtaining the second pulsating direct current voltage (i.e., V_bus) that has a small fluctuation. The second pulsating direct current voltage may be inputted to the second-level conversion circuit 240 for voltage transformation.

In some embodiments, the first-level conversion circuit 230 may be a direct current transformer based on an LLC resonant converter, and may further include a resonant capacitor Cr, a resonant inductor Lr, an excitation inductor Lm. The resonant capacitor Cr, the resonant inductor Lr, and the excitation inductor Lm may constitute a resonant network. The resonant capacitor Cr can prevent the transformer 502 from entering a saturated state, thereby achieving efficient isolation and transformation on the first pulsating direct current voltage.

The switch SR1 and the switch SR2 may be configured to rectify the voltage outputted by the transformer 232. In at least one embodiment, the control module 260 may further transmit the control signal to the switch SR1 and the switch SR2 to control the ON/OFF of the switch SR1 and the switch SR2. By controlling the ON/OFF of the switch SR1 and the switch SR2, the output power of the transformer 502 can be adjusted to enable the obtained second pulsating direct current voltage to satisfy the requirement.

It should be noted that FIG. 5 illustrates only on implementation of a circuit structure of the first-level conversion circuit 230. The first-level conversion circuit 230 may also be another circuit topology structure, or may include more or fewer elements and components than those illustrated in FIG. 5, which is not specifically limited in the embodiments of the present disclosure.

According to the embodiments of the present disclosure, the valley voltage of the first pulsating direct current voltage inputted the first-level conversion circuit 230 can be increased by the valley-fill circuit 210, and thus a valley voltage of the second pulsating direct current voltage outputted by the first-level conversion circuit 230 can be also increased, and the outputted second pulsating direct current voltage has a relatively small fluctuation, which can be more conveniently subjected to the voltage transformation of the second-level conversion circuit 240, thereby simplifying a circuit design of the second-level conversion circuit 240.

In some embodiments, the second-level conversion circuit 240 may include a direct current/direct current conversion circuit (DC/DC circuit), and the second-level conversion circuit 240 can convert the second pulsating direct current voltage outputted by the first-level conversion circuit 230 into the stable direct current voltage and output the stable direct current voltage. In at least one embodiment, the second-level conversion circuit 240 may include a Buck-Boost circuit that may convert a second pulsating direct current voltage greater than or smaller than a target voltage into the stable direct current voltage, which may be a constant direct current voltage with a voltage value of the target voltage. It should be noted that the constant direct current voltage described in the present disclosure may also be a direct current voltage having a certain fluctuation.

Figure 6:
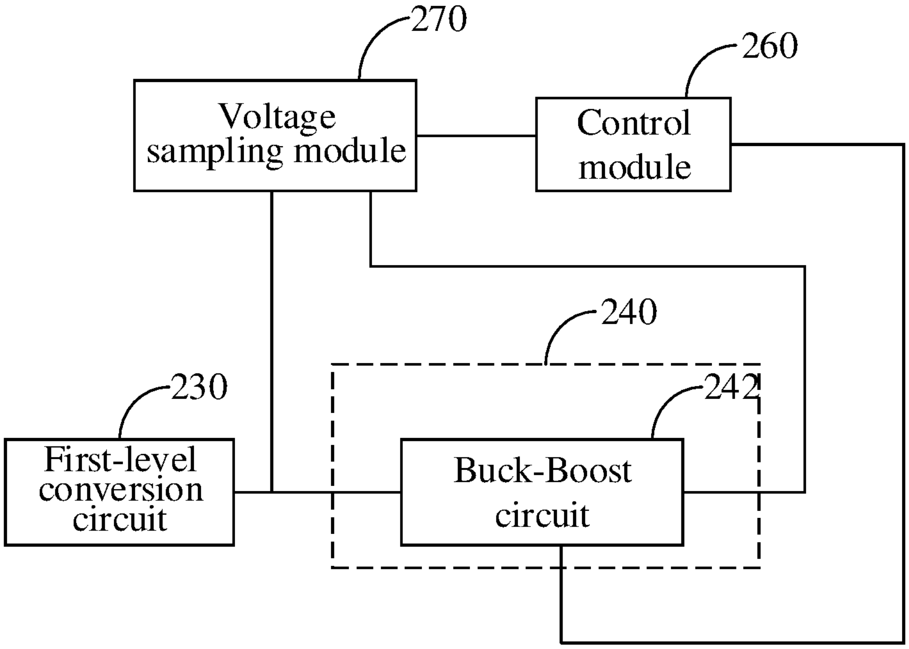
FIG. 6 is a schematic diagram of a connection structure of a Buck-Boost circuit according to an embodiment.

Illustratively, FIG. 6 is a schematic diagram of a connection structure of a Buck-Boost circuit according to an embodiment. As illustrated in FIG. 6, in an embodiment, the second-level conversion circuit 240 may include a Buck-Boost circuit 242, and the power supply apparatus 200 may further include a voltage sampling module 270. The voltage sampling module 270 may be connected to the output terminal of the first-level conversion circuit 230, an output terminal of the Buck-Boost circuit 242, and the control module 260, respectively. The voltage sampling module 270 can detect the voltage value of the second pulsating direct current voltage outputted by the first-level conversion circuit 230 and an output voltage of the Buck-Boost circuit 242, and it can output a feedback signal to the control module 260. The control module 260 can receive the feedback signal outputted by the voltage sampling module 270, obtain the voltage value of the second pulsating direct current voltage and the output voltage of the Buck-Boost circuit 242 based on the feedback signal, compare the voltage value of the second pulsating direct current voltage with the output voltage of the Buck-Boost circuit 242, and control an operation mode of the Buck-Boost circuit 242 based on the comparison result. The Buck-Boost circuit 242 can be accurately controlled by the control module 260 to switch between the operation modes. Therefore, the outputted direct current voltage is more stable and accurate, and the Buck-Boost circuit 242 only operates in one mode, thereby saving power consumption.

The operation mode of the Buck-Boost circuit 242 may have a Buck circuit mode and a Boost circuit mode. When it is detected that the voltage value of the second pulsating direct current voltage is greater than the output voltage of the Buck-Boost circuit 242, the control module 260 may control the Buck-Boost circuit 242 to be switched to the Buck circuit mode. When it is detected that the voltage value of the second pulsating direct current voltage is smaller than the output voltage of the Buck-Boost circuit 242, the control module 260 may control the Buck-Boost circuit 242 to be switched to the Boost circuit mode.

Figure 7:
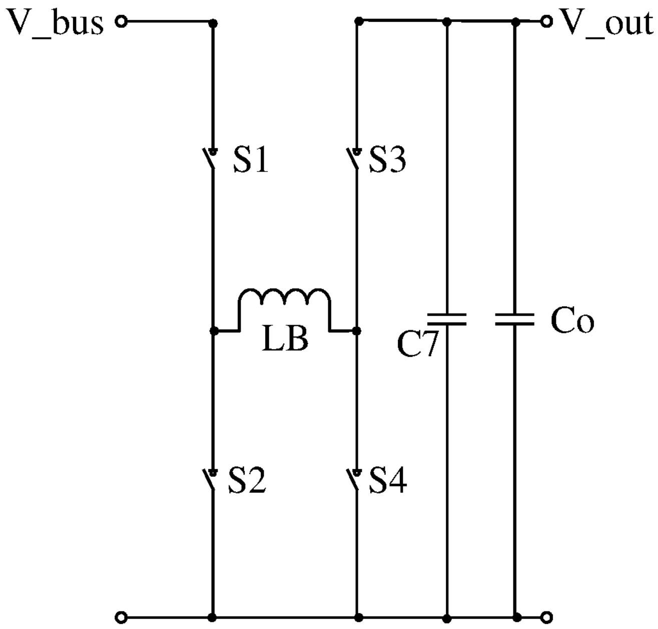
FIG. 7 is a schematic structural diagram of a Buck-Boost circuit according to an embodiment.

Illustratively, FIG. 7 is a schematic structural diagram of a Buck-Boost circuit according to an embodiment. As illustrated in FIG. 7, the Buck-Boost circuit 242 may include a switching device S1, a switching device S2, a switching device S3, a switching device S4, an inductor LB, a capacitor C7, and a capacitor Co. The capacitor C7 and the capacitor Co can be configured to perform filtering on the outputted voltage, to stabilize the outputted voltage. When the Buck-Boost circuit 242 operates in the Buck circuit mode, the switching device S3 is always switched on, the switching device S4 is always switched off, and the switching device S1, the switching device S1, and the switching device S2 are switched between the switch-on state and the switch-off state at a high frequency. In this way, the second pulsating direct current voltage (i.e., V_bus) and the inductance LB inputted by the Buck-Boost circuit 242 can jointly provide the output terminal with the electric energy. After the switching device S1 is switched off and the switching device S2 is switched on, a continuous current circuit may be provided to the inductor LB. By switching the switching device S1 and the switching device S2 between the switch-on state and the switch-off state, the chopping modulation on the second pulsating direct current voltage can be achieved, to obtain the stable direct current voltage.

When the Buck-Boost circuit 242 operates in the Boost circuit mode, the switching device S1 is always switched on, the switching device S2 is always switched off, and the switching device S3 and the switching device S4 are switched between the switch-on state and the switch-off state at a high frequency. When the switching device S4 is switched on and the switching device S3 is switched off, the second pulsating direct current voltage (i.e., V_bus) may charge the inductor LB. When the switching device S3 is switched on and the switching device S4 is switched off, the second pulsating direct current voltage (i.e., V_bus) and the inductor LB may together provide the output terminal with the electric energy. By switching the switching device S3 and the switching device S4 between the switch-on state and the switch-off state, the chopping modulation on the second pulsating direct current voltage can be achieved, to obtain the stable direct current voltage.

It should be noted that the above-mentioned switching device S1, switching device S2, switching device S3, and switching device S4 may be switching devices such as a diode and a MOS transistor, which are not limited herein. The Buck-Boost circuit 242 may also be other circuit topological structures and is not limited to the structure illustrated in FIG. 7. The Buck-Boost circuit 242 may also automatically perform voltage comparison to adjust the operation mode and ON/OFF of each switching device, i.e., the control module 260 and the voltage sampling module 270 are not essential to the Buck-Boost circuit. The second-level conversion circuit 240 may also be other DC/DC circuits, which is not limited to the Buck-Boost circuit described above.

In the embodiments of the present disclosure, the rectified pulsating direct current voltage is converted by means of a two-level circuit architecture to obtain the stable direct current voltage, such that the direct current voltage outputted by the power supply apparatus can be more stable. Moreover, after the valley voltage of the first pulsating direct current voltage is increased, the valley voltage of the second pulsating direct current voltage inputted to the second-level conversion circuit is also increased, which can lower the peak current of the second-level conversion circuit, thereby reducing the size of the magnetic element of the second-level conversion circuit and the volume of the power supply apparatus.

Further, in the embodiments of the present disclosure, the third capacitor 214, the fourth capacitor 232, the fifth capacitor, the sixth capacitor, the capacitor C7, and the like may all be the capacitors having the capacity smaller than the capacity threshold, enabling the entire power supply apparatus to be more compact. Therefore, the volume of the power supply apparatus can be effectively reduced, and the portability of the power supply apparatus can be improved.

According to the embodiments of the present disclosure, the valley-fill circuit can increase the valley voltage of the first pulsating direct current voltage inputted to the first-level conversion circuit. Since the valley-fill circuit can directly increase the valley voltage of the first pulsating direct current voltage inputted to the first-level conversion circuit, the voltage outputted by the valley-fill circuit can be relatively high, the valley-fill circuit according to the embodiments of the present disclosure has higher efficiency than other manners that, for example, the first pulsating direct current voltage is first converted through the first-level conversion circuit to obtain the second pulsating direct current voltage, and the valley voltage of the second pulsating direct current voltage is increased by the valley-fill circuit; or the valley-fill circuit is used to increase the valley voltage of the direct current voltage outputted by the second-level conversion circuit after the second-level conversion circuit outputs the stable direct current voltage.

The embodiments of the present disclosure further provide a charging method, applied in a power supply apparatus. The charging method include: rectifying, by a rectifier module, a received alternating current voltage to obtain a first pulsating direct current voltage; converting, by a conversion module, the first pulsating direct current voltage to obtain a stable direct current voltage; and releasing, by a valley-fill circuit, electric energy to the conversion module when a voltage value of the first pulsating direct current voltage is smaller than a first voltage threshold, to increase a valley voltage of the first pulsating direct current voltage inputted to the conversion module, wherein the valley-fill circuit has an input terminal connected to an output terminal of the rectifier module and an output terminal connected to an input terminal of the conversion module.

In an embodiment, the valley-fill circuit includes a first capacitor, and said releasing, by the valley-fill circuit, the electric energy to the conversion module when the voltage value of the first pulsating direct current voltage is smaller than the first voltage threshold includes: providing, by the first capacitor, when the voltage value of the first pulsating direct current voltage outputted by the rectifier module is smaller than the first voltage threshold, the electric energy to an input of the conversion module, enabling the voltage value of the first pulsating direct current voltage inputted to the conversion module to be the same as a voltage value of the first capacitor.

In an embodiment, the charging method further includes: performing, when the voltage value of the first pulsating direct current voltage outputted by the rectifier module satisfies a first voltage condition or when the voltage value of the first capacitor satisfies a second voltage condition, buck conversion on the first pulsating direct current voltage outputted by the rectifier module; charging the first capacitor with the first pulsating direct current voltage subjected to the buck conversion; and stopping charging the first capacitor when the voltage value of the first capacitor reaches the first voltage threshold.

In an embodiment, the valley-fill circuit further includes second capacitor, and the charging method further includes, subsequent to said providing, by the first capacitor, the electric energy to an input of the conversion module: releasing, by the second capacitor, the electric energy when the voltage value of the first pulsating direct current voltage outputted by the rectifier module reaches a second voltage threshold, to provide the input of the conversion module with the electric energy, the second voltage threshold being smaller than the first voltage threshold.

In an embodiment, said releasing, by the second capacitor, the electric energy to provide the input of the conversion module with the electric energy includes: performing buck conversion on an output voltage of the second capacitor; and providing the electric energy to an input of the rectifier module through the output voltage subjected to the buck conversion.

In an embodiment, the charging method further includes: charging, when the voltage value of the first pulsating direct current voltage outputted by the rectifier module is greater than a voltage value of the second capacitor, the second capacitor with the first pulsating direct current voltage outputted by the rectifier module.

In an embodiment, the conversion module includes a first-level conversion circuit and a second-level conversion circuit, and said converting, by the conversion module, the first pulsating direct current voltage to obtain the stable direct current voltage includes: performing, by the first-level conversion circuit, isolation conversion on the first pulsating direct current voltage to obtain a second pulsating direct current voltage; and converting, by the second-level conversion circuit, the second pulsating direct current voltage to obtain the stable direct current voltage.

In an embodiment, the first-level conversion circuit includes a voltage transformation unit and a switching unit, and said performing, by the first-level conversion circuit, the isolation conversion on the first pulsating direct current voltage to obtain the second pulsating direct current voltage includes: performing, by the switching unit, chopping modulation on the inputted first pulsating direct current voltage to obtain a modulation voltage; and performing, by the voltage transformation unit, voltage transformation and rectification processing on the modulation voltage to obtain the second pulsating direct current voltage.

In an embodiment, the charging method further includes: controlling, in response to detecting that the voltage value of the inputted first pulsating direct current voltage is greater than a third voltage threshold, the switching unit to be switched to a half-bridge operating mode; and controlling, in response to detecting that an effective voltage value of the inputted first pulsating direct current voltage is smaller than a fourth voltage threshold, the switching unit to be switched to a full-bridge operating mode.

Figure 8:
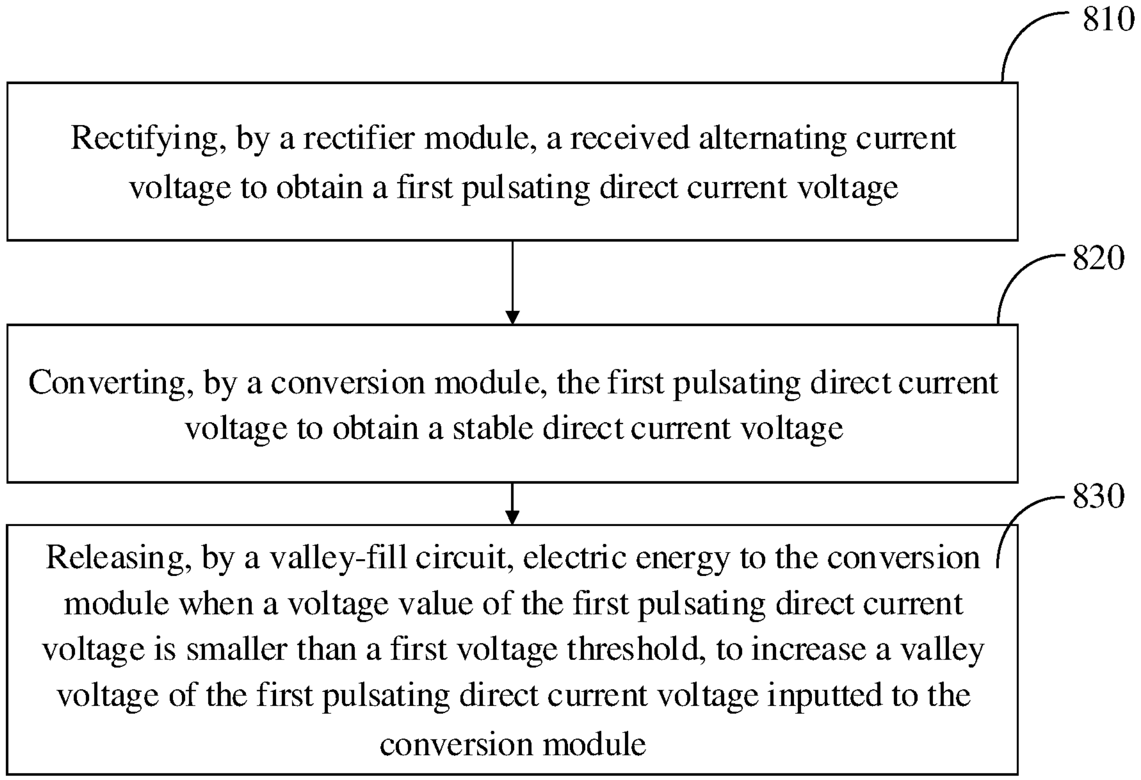
FIG. 8 is a flowchart of a charging method according to an embodiment.

As illustrated in FIG. 8, an embodiment provides a charging method, which can be applied in the power supply apparatus 200 described in the above embodiments. The method includes the following actions in blocks 810 to 830.

In block 810, a received alternating current voltage is rectified by a rectifier module to obtain a first pulsating direct current voltage.

In block 820, the first pulsating direct current voltage is converted by a conversion module to obtain a stable direct current voltage.

In block 830, when a voltage value of the first pulsating direct current voltage is smaller than a first voltage threshold, electric energy is released by a valley-fill circuit to a first-level conversion module, to increase a valley voltage of the first pulsating direct current voltage inputted to the conversion module. The valley-fill circuit has an input terminal connected to an output terminal of the rectifier module and an output terminal connected to an input terminal of the conversion module.

In the embodiments of the present disclosure, when the voltage value of the first pulsating direct current voltage outputted by the rectifier module is smaller than the first voltage threshold, the valley-fill circuit releases the electric energy to the conversion module to increase the valley voltage of the first pulsating direct current voltage inputted to the conversion module, allowing the valley voltage of the first pulsating direct current voltage inputted to the conversion module to be sufficient to provide the conversion module with sufficient power support, thereby ensuring the stability of the output voltage of the power supply apparatus. Moreover, the valley voltage of the first pulsating direct current voltage can be increased, and the peak current during subsequent voltage conversion can be reduced, such that the size of the magnetic element in the post-level circuit can be reduced, thereby reducing the volume of the power supply apparatus.

In an embodiment, the valley-fill circuit includes a first capacitor. Action in block 840 may include: providing, by the first capacitor, when the voltage value of the first pulsating direct current voltage outputted by the rectifier module is smaller than the first voltage threshold, the electric energy to an input of the conversion module, enabling the voltage value of the first pulsating direct current voltage inputted to the conversion module to be the same as a voltage value of the first capacitor.

Figure 9:
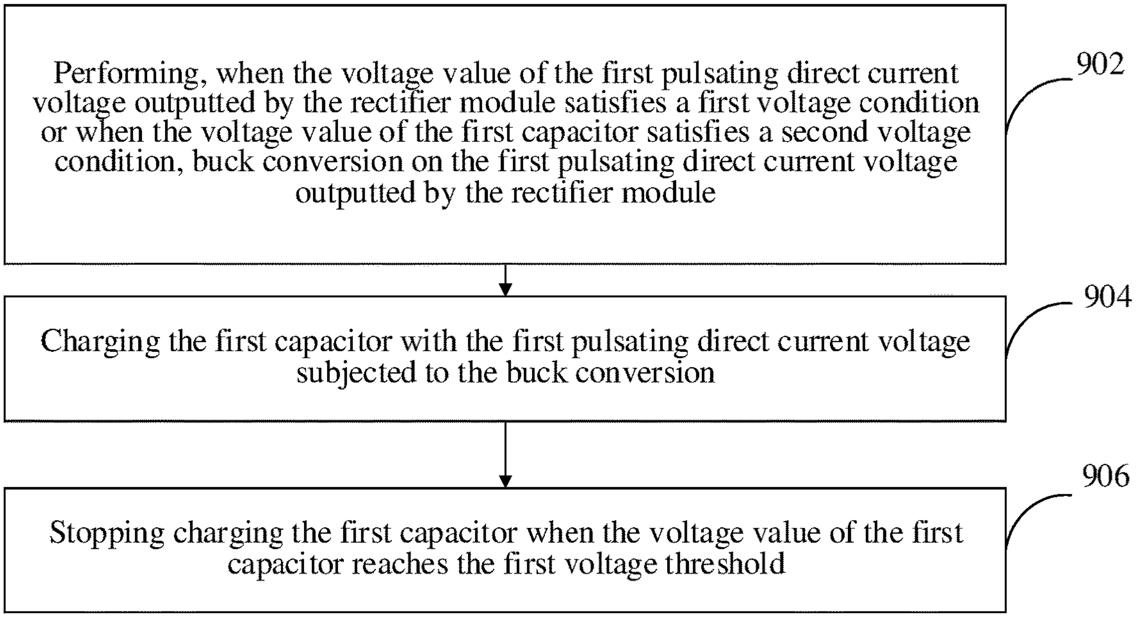
FIG. 9 is a flowchart of charging a first capacitor according to an embodiment.

As illustrated in FIG. 9, in an embodiment, the charging method further includes the following actions in blocks 902 to 906.

In block 902, when the voltage value of the first pulsating direct current voltage outputted by the rectifier module satisfies a first voltage condition or when the voltage value of the first capacitor satisfies a second voltage condition, buck conversion is performed on the first pulsating direct current voltage outputted by the rectifier module.

In block 904, the first capacitor is charged with the first pulsating direct current voltage subjected to the buck conversion.

In block 906, the first capacitor is stopped being charged when the voltage value of the first capacitor reaches the first voltage threshold.

In an embodiment, the valley-fill circuit further includes a second capacitor. The method further includes, subsequent to the action of providing, by the first capacitor, the electric energy to an input of a first-level conversion circuit: releasing, by the second capacitor, the electric energy when the voltage value of the first pulsating direct current voltage outputted by the rectifier module reaches a second voltage threshold, to provide the input of the first-level conversion circuit with the electric energy. The second voltage threshold is smaller than the first voltage threshold.

In an embodiment, the action of releasing, by the second capacitor, the electric energy to provide the input of the first-level conversion circuit with the electric energy includes: performing buck conversion on an output voltage of the second capacitor; and providing the electric energy to an input of the rectifier module through the output voltage subjected to the buck conversion.

In an embodiment, the charging method further includes: charging, when the voltage value of the first pulsating direct current voltage outputted by the rectifier module is greater than a voltage value of the second capacitor, the second capacitor with the first pulsating direct current voltage outputted by the rectifier module.

In at least one embodiment, the first capacitor may be the low-voltage capacitor, and the second capacitor may be the high-voltage capacitor.

In the embodiments of the present disclosure, by means of a combination of the low-voltage capacitor and the high-voltage capacitor, the energy can be absorbed and released to the maximum extent through the low-voltage and large-capacity capacitor, thereby improving a utilization rate of the capacitor. Further, the low-voltage capacitor may include, but not limited to, any one of the tantalum capacitor and the ceramic chip capacitor, and the high-voltage capacitor may include, but not limited to, the ceramic chip capacitor. By using the low-voltage capacitor having a small volume and a large capacity to store energy at a low-voltage input stage of the first pulsating direct current voltage, the total capacitance quantity and size can be reduced, thereby integrally reducing the volume of the power supply apparatus.

In an embodiment, the conversion module includes a first-level conversion circuit and a second-level conversion circuit.

The action in block 820 may include: performing, by the first-level conversion circuit, isolation conversion on the first pulsating direct current voltage to obtain a second pulsating direct current voltage; and converting, by the second-level conversion circuit, the second pulsating direct current voltage to obtain the stable direct current voltage.

In an embodiment, the first-level conversion circuit includes a voltage transformation unit and a switching unit. The action of performing, by the first-level conversion circuit, the isolation conversion on the first pulsating direct current voltage to obtain the second pulsating direct current voltage includes: performing, by the switching unit, chopping modulation on the inputted first pulsating direct current voltage to obtain a modulation voltage; and performing, by the voltage transformation unit, voltage transformation and rectification processing on the modulation voltage to obtain the second pulsating direct current voltage.

In an embodiment, the charging method further includes: controlling, in response to detecting that the voltage value of the inputted first pulsating direct current voltage is greater than a third voltage threshold, the switching unit to be switched to a half-bridge operating mode; and controlling, in response to detecting that an effective voltage value of the inputted first pulsating direct current voltage is smaller than a fourth voltage threshold is detected, the switching unit to be switched to a full-bridge operating mode.

In an embodiment, the second-level conversion circuit includes a direct current/direct current conversion circuit. In at least one embodiment, the direct current/direct current conversion circuit includes a Buck-Boost circuit. The above method further includes: controlling, in response to detecting that the voltage value of the second pulsating direct current voltage is greater than the output voltage of the Buck-Boost circuit, the Buck-Boost circuit to be switched to the Buck circuit mode; and controlling, in response to detecting that the voltage value of the second pulsating direct current voltage is smaller than the output voltage of the Buck-Boost circuit, the Buck-Boost circuit to be switched to the Boost circuit mode.

It should be noted that the description of the charging method provided in the embodiments of the present disclosure may refer to the description of the power supply apparatus in the above embodiments, and details thereof will be omitted herein.

In the embodiments of the present disclosure, the rectified pulsating direct current voltage is converted by means of the two-level circuit architecture to obtain the stable direct current voltage, such that the direct current voltage outputted by the power supply apparatus can be more stable. Moreover, after the valley voltage of the first pulsating direct current voltage is increased, the valley voltage of the second pulsating direct current voltage inputted to the second-level conversion circuit is also increased, which can lower the peak current of the second-level conversion circuit, thereby reducing the size of the magnetic element of the second-level conversion circuit and the volume of the power supply apparatus.

The embodiments of the present disclosure provide a computer-readable storage medium having a computer program stored thereon. The computer program, when executed by a processor, implements the method described in the respective embodiments.

The embodiments of the present disclosure provide a computer program product. The computer program product includes a non-transitory computer-readable storage medium having a computer program stored thereon. The computer program, when executed by a processor, implements the method described in each of the embodiments.

Figure 10:
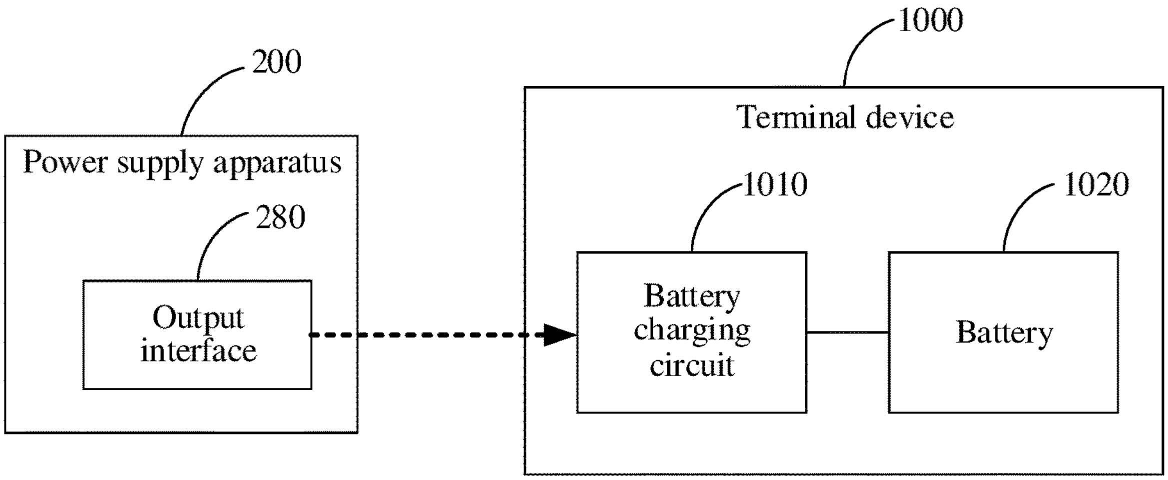
FIG. 10 is a block diagram of a charging system according to an embodiment.

As illustrated in FIG. 10, a charging system is provided. The charging system may include the power supply apparatus 200 described in the above embodiments and a terminal device 1000. The terminal device 1000 can be charged by the power supply apparatus 200, whose charging mode may be wired charging or wireless charging. The power supply apparatus 200 may further include an output interface 280, and the terminal device 1000 may include a battery charging circuit 1010 and a battery 1020.

The power supply apparatus 200 may establish a charging channel with the terminal device 1000. A charging circuit may be formed between the power supply apparatus 200 and the terminal device 1000. The output interface 280 may be connected to the output terminal of the second-level conversion circuit 240 of the power supply apparatus 200. After the charging channel is established between the power supply apparatus 200 and the terminal device 1000, the output interface 280 may be configured to output the stable direct current voltage to the terminal device 1000.

In some embodiments, the power supply apparatus 200 may charge the terminal device 1000 in a direct charging manner, the direct current voltage outputted by the power supply apparatus 200 may be a direct current voltage satisfying the charging requirement of the terminal device 1000 and be directly loaded to the battery. The battery charging circuit 1010 of the terminal device 1000 may be configured to receive the stable direct current voltage outputted by the output interface 280, and load the stable direct current voltage to the battery 1020. In at least one embodiment, the battery charging circuit 1010 may include elements and components such as a switch to form a direct charging path.

In at least one embodiment, in order to implement the direct charging mode, a communication connection may also be established between the power supply apparatus 200 and the terminal device 1000. The terminal device 1000 maintain a communication with the power supply apparatus 200 during direct charging to form a closed-loop feedback mechanism, enabling the power supply apparatus 200 to obtain a state of the battery 1020 in real time, thereby continuously adjusting the outputted direct current voltage to ensure that a charging voltage and/or a charging current provided by the power supply apparatus 200 match a voltage and/or a current currently required by the battery 1020.

In some embodiments, when the direct current voltage outputted by the power supply apparatus 200 does not satisfy the voltage required by the battery 1020 of the terminal device 1000, the battery charging circuit 1010 of the terminal device 1000 may convert the received direct current voltage to obtain the voltage currently required by the battery 1020, and load the obtained voltage to the battery 1020 to charge the battery 1020. In at least one embodiment, the battery charging circuit 1010 may include elements and components such as a charge pump, a switching device, and a capacitor, but is not limited thereto.

Those skilled in the art can understand that all or part of the steps of the method according to any of the above embodiments can be implemented by relevant hardware instructed by the computer program. The computer program can be stored in the non-volatile computer-readable storage medium. The computer program, when executed, may include the steps of the method according to any of the above embodiments. Here, the memory medium may be a magnetic disk, an optical disc, a Read-Only Memory (ROM), etc.

Here, any reference to a memory, a storage, a database, or other media as used in the embodiments provided by the present disclosure may include a non-volatile and/or a volatile memory. The suitable non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) used as an external cache memory. By way of illustration, rather than limitation, an RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

It should be understood that "an embodiment" or "one embodiment" mentioned throughout the specification mean that specific features, structures, or characteristics related to the embodiments are included in at least one embodiment of the present disclosure. Thus, "in an embodiment" or "in one embodiment" appearing throughout the specification does not necessarily refer to a same embodiment. In addition, these specific features, structures, or characteristics can be combined with one or more embodiments in any suitable manner. Those skilled in the art should also know that the embodiments described in the specification are all optional embodiments, and has involved actions and modules that are not necessarily required in the present disclosure.

It should also be understood that in the various embodiments of the present disclosure, numerical values of sequence numbers of the above processes do not mean an execution order and should not constitute any limitation to an implementation process of the embodiments of the present disclosure as the execution order of individual processes should be determined by their functions and internal logics.

The modules illustrated as separate components may be or not be separated physically, and components shown as units may be or not be physical modules, i.e., may be located at one position, or distributed onto a plurality of network units. It is possible to select some or all of the units according to actual needs, for achieving the objective of embodiments of the present disclosure.

In addition, respective functional units in respective embodiments of the present disclosure may be integrated in one processing unit, the respective units may be separate physical existence, or two or more units may be integrated in one unit. The above integrated units can be implemented in a form of hardware, or in a form of a functional software unit.

When the integrated units are implemented in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device, which can be a processor in a computer device in a further embodiment) to execute all or part of steps in the methods described in respective embodiments of the present disclosure.

The power supply apparatus, and the charging method and system provided in the embodiments of the present disclosure have been described in detail above. Specific examples are used herein to illustrate the principle and implementations of the present disclosure. The above description of the embodiments is only used to help understanding the method and the core concept of the present disclosure. Those skilled in the art can make changes to specific implementations and an application scope based on the concept of the present disclosure. In summary, the content of the specification should not be construed as limitations on the present disclosure.

What is claimed is:

1. A power supply apparatus, comprising:

a rectifier module configured to rectify an alternating current voltage to obtain a first pulsating direct current voltage;

a conversion module configured to convert the first pulsating direct current voltage to obtain a stable direct current voltage; and a valley-fill circuit having an input terminal connected to an output terminal of the rectifier module and an output terminal connected to an input terminal of the conversion module, the valley-fill circuit being configured to release electric energy to the conversion module when a voltage value of the first pulsating direct current voltage is smaller than a first voltage threshold, to increase a valley voltage of the first pulsating direct current voltage inputted to the conversion module;

wherein the valley-fill circuit comprises a first capacitor and a buck unit connected to the first capacitor, the buck unit is configured to perform buck conversion on the first pulsating direct current voltage outputted by the rectifier module, and charge the first capacitor with the first pulsating direct current voltage subjected to the buck conversion.

2. The apparatus according to claim 1, wherein the first capacitor is configured to provide, when the voltage value of the first pulsating direct current voltage outputted by the rectifier module is smaller than the first voltage threshold, the electric energy to an input of the conversion module, enabling the voltage value of the first pulsating direct current voltage inputted to the conversion module to be the same as a voltage value of the first capacitor.

3. The apparatus according to claim 2, wherein:

the valley-fill circuit further comprises a first diode, the first diode having a cathode connected to the input terminal of the conversion module and an anode connected to the first capacitor; and the first capacitor is further configured to release, when the voltage value of the first pulsating direct current voltage is smaller than the first voltage threshold, the electric energy to the input of the conversion module through the first diode.

4. The apparatus according to claim 2, wherein the buck unit is specifically configured to:

perform, when the voltage value of the first pulsating direct current voltage outputted by the rectifier module satisfies a first voltage condition or when the voltage value of the first capacitor satisfies a second voltage condition, the buck conversion on the first pulsating direct current voltage outputted by the rectifier module; and charge the first capacitor with the first pulsating direct current voltage subjected to the buck conversion.

5. The apparatus according to claim 4, wherein the buck unit is further configured to stop, when the voltage value of the first capacitor reaches the first voltage threshold, charging the first capacitor by stopping operating.

6. The apparatus according to claim 4, wherein the valley-fill circuit further comprises a second capacitor configured to release the electric energy when the voltage value of the first pulsating direct current voltage outputted by the rectifier module reaches a second voltage threshold, to provide the electric energy to the input of the conversion module, the second voltage threshold being smaller than the first voltage threshold.

7. The apparatus according to claim 6, wherein the buck unit is further connected to the second capacitor, and wherein the buck unit is further configured to:

perform, when the voltage value of the first pulsating direct current voltage outputted by the rectifier module reaches the second voltage threshold, the buck conversion on an output voltage of the second capacitor by starting operating; and provide the electric energy to the input of the conversion module through the output voltage subjected to the buck conversion.

8. The apparatus according to claim 7, further comprising:

a detection module connected to the output terminal of the rectifier module and configured to detect the voltage value of the first pulsating direct current voltage outputted by the rectifier module; and a control module connected to the detection module and the buck unit, the control module being configured to control, when the voltage value of the first pulsating direct current voltage detected by the detection module reaches the second voltage threshold, the buck unit to start operating.

9. The apparatus according to claim 6, wherein the second capacitor is further configured to charge based on the first pulsating direct current voltage outputted by the rectifier module when the voltage value of the first pulsating direct current voltage outputted by the rectifier module is greater than a voltage value of the second capacitor.

10. The apparatus according to claim 9, wherein the valley-fill circuit further comprises a second diode, the second diode having a cathode connected to the second capacitor and an anode connected to the output terminal of the rectifier module.

11. The apparatus according to claim 6, wherein:

the first capacitor is a low-voltage capacitor;

the second capacitor is a high-voltage capacitor;

a nominal voltage of the low-voltage capacitor is smaller than a first predetermined value;

a nominal voltage of the high-voltage capacitor is greater than a second predetermined value; and the first predetermined value is smaller than the second predetermined value.

12. The apparatus according to claim 11, wherein:

the low-voltage capacitor comprises any one of a tantalum capacitor and a ceramic chip capacitor; and the high-voltage capacitor comprises a ceramic chip capacitor.

13. The apparatus according to claim 1, wherein the conversion module comprises:

a first-level conversion circuit configured to perform isolation conversion on the first pulsating direct current voltage to obtain a second pulsating direct current voltage; and a second-level conversion circuit configured to convert the second pulsating direct current voltage to obtain the stable direct current voltage.

14. The apparatus according to claim 13, wherein the first-level conversion circuit comprises:

a switching unit configured to perform chopping modulation on the inputted first pulsating direct current voltage to obtain a modulation voltage; and a voltage transformation unit configured to perform voltage transformation and rectification processing on the modulation voltage to obtain the second pulsating direct current voltage.

15. The apparatus according to claim 14, wherein the switching unit is further configured to be switched to:

a half-bridge operating mode when the voltage value of the inputted first pulsating direct current voltage is greater than a third voltage threshold; and a full-bridge operating mode when an effective voltage value of the inputted first pulsating direct current voltage is smaller than a fourth voltage threshold.

16. The apparatus according to claim 13, wherein:

the first-level conversion circuit comprises a direct current voltage transformation circuit; and the second-level conversion circuit comprises a direct current/direct current conversion circuit.

17. A charging system, comprising:

a terminal device; and a power supply apparatus having an output interface connected to an output terminal of a second-level conversion circuit of the power supply apparatus, the power supply apparatus comprising:

a rectifier module configured to rectify an alternating current voltage to obtain a first pulsating direct current voltage;

a conversion module configured to convert the first pulsating direct current voltage to obtain a stable direct current voltage; and a valley-fill circuit having an input terminal connected to an output terminal of the rectifier module and an output terminal connected to an input terminal of the conversion module, the valley-fill circuit being configured to release electric energy to the conversion module when a voltage value of the first pulsating direct current voltage is smaller than a first voltage threshold, to increase a valley voltage of the first pulsating direct current voltage inputted to the conversion module, wherein the terminal device comprises a battery charging circuit;

wherein the battery charging circuit is configured to receive the stable direct current voltage outputted by the output interface and load the stable direct current voltage to a battery; and wherein the valley-fill circuit comprises a first capacitor and a buck unit connected to the first capacitor, the buck unit is configured to perform buck conversion on the first pulsating direct current voltage outputted by the rectifier module, and charge the first capacitor with the first pulsating direct current voltage subjected to the buck conversion.

18. The charging system according to claim 17, wherein the first capacitor is configured to provide, when the voltage value of the first pulsating direct current voltage outputted by the rectifier module is smaller than the first voltage threshold, the electric energy to an input of the conversion module, enabling the voltage value of the first pulsating direct current voltage inputted to the conversion module to be the same as a voltage value of the first capacitor; and wherein the valley-fill circuit further comprises a second capacitor configured to release the electric energy when the voltage value of the first pulsating direct current voltage outputted by the rectifier module reaches a second voltage threshold, to provide the electric energy to the input of the conversion module, the second voltage threshold being smaller than the first voltage threshold.

19. The charging system according to claim 17, wherein the conversion module comprises:

a first-level conversion circuit configured to perform isolation conversion on the first pulsating direct current voltage to obtain a second pulsating direct current voltage; and the second-level conversion circuit configured to convert the second pulsating direct current voltage to obtain the stable direct current voltage.

20. A power supply apparatus, comprising:

a rectifier module configured to rectify an alternating current voltage to obtain a first pulsating direct current voltage;

a conversion module configured to convert the first pulsating direct current voltage to obtain a stable direct current voltage; and a valley-fill circuit having an input terminal connected to an output terminal of the rectifier module and an output terminal connected to an input terminal of the conversion module, the valley-fill circuit being configured to release electric energy to the conversion module when a voltage value of the first pulsating direct current voltage is smaller than a first voltage threshold, to increase a valley voltage of the first pulsating direct current voltage inputted to the conversion module;

wherein the conversion module comprises:

a first-level conversion circuit configured to perform isolation conversion on the first pulsating direct current voltage to obtain a second pulsating direct current voltage; and a second-level conversion circuit configured to convert the second pulsating direct current voltage to obtain the stable direct current voltage.

* * * * *